(12) United States Patent
Chae et al.

(10) Patent No.: US 11,321,478 B2
(45) Date of Patent: May 3, 2022

(54) METHOD AND SYSTEM FOR WIRELESSLY CONNECTING DEVICES

(71) Applicant: NHN Entertainment Corporation, Seongnam-si (KR)

(72) Inventors: Yeonseong Chae, Seongnam-si (KR); JiHae Kim, Seongnam-si (KR); Jihye Kim, Seongnam-si (KR); SeYoung Jang, Seongnam-si (KR); Nam kyung Kim, Seongnam-si (KR); BeomSeok Jang, Seongnam-si (KR); Jin Kyung Lyu, Seongnam-si (KR); MinKyu Lee, Seongnam-si (KR); Junghwan Park, Seongnam-si (KR); Yong Seok Hong, Seongnam-si (KR); Jinwoo Kim, Seongnam-si (KR); Yonghee Lee, Seongnam-si (KR); JongNa Kim, Seongnam-si (KR); Jinwoo Lee, Seongnam-si (KR); Nam Jug Kim, Seongnam-si (KR)

(73) Assignee: NHN Entertainment Corporation, Seongnam-si (KR)

( * ) Notice: Subject to any disclaimer, the term of this patent is extended or adjusted under 35 U.S.C. 154(b) by 264 days.

(21) Appl. No.: 16/032,456

(22) Filed: Jul. 11, 2018

(65) Prior Publication Data
US 2019/0018974 A1 Jan. 17, 2019

(30) Foreign Application Priority Data

Jul. 12, 2017 (KR) .......................... 10-2017-0088512

(51) Int. Cl.
*G06F 21/62* (2013.01)
*H04L 67/06* (2022.01)
(Continued)

(52) U.S. Cl.
CPC .......... *G06F 21/6218* (2013.01); *G06F 16/13* (2019.01); *G06F 16/16* (2019.01);
(Continued)

(58) Field of Classification Search
None
See application file for complete search history.

(56) References Cited

U.S. PATENT DOCUMENTS 9,204,367 B2 12/2015 Sung
9,723,004 B2 8/2017 Yang et al.
(Continued)

FOREIGN PATENT DOCUMENTS

JP 2007-088754 4/2007
JP 2007-88754 4/2007
(Continued)

*Primary Examiner* — Amresh Singh
(74) *Attorney, Agent, or Firm* — H.C. Park & Associates, PLC

(57) ABSTRACT

A method for wirelessly connecting devices performed in a wireless connection system implemented with a computer includes: providing a list of devices capable of remote access with a user account of a user; connecting devices based on the list of devices capable of remote access; automatically updating a list of folders in the connected devices and a list of files included in the folders; and integrally managing files included in the connected devices.

20 Claims, 20 Drawing Sheets

(51) Int. Cl.
*H04W 12/06* (2021.01)
*H04W 76/10* (2018.01)
*H04W 12/08* (2021.01)
*G06F 16/13* (2019.01)
*G06F 16/16* (2019.01)
*G06F 16/182* (2019.01)
*G06F 21/44* (2013.01)
*G06F 21/60* (2013.01)
*H04W 84/12* (2009.01)
*H04L 67/025* (2022.01)
*H04W 12/00* (2021.01)

(52) U.S. Cl.
CPC .......... *G06F 16/1824* (2019.01); *G06F 21/44* (2013.01); *G06F 21/604* (2013.01); *H04L 67/06* (2013.01); *H04W 12/06* (2013.01); *H04W 12/08* (2013.01); *H04W 76/10* (2018.02); *H04L 67/025* (2013.01); *H04W 12/009* (2019.01); *H04W 84/12* (2013.01)

(56) References Cited

U.S. PATENT DOCUMENTS

| | | | |
|---|---|---|---|
| 9,912,652 | B2 | 3/2018 | Hirakata et al. |
| 10,021,724 | B2 | 7/2018 | Sung |
| 10,270,751 | B2 | 4/2019 | Hirakata et al. |
| 2004/0117310 | A1* | 6/2004 | Mendez .............. H04L 63/1416 |
| | | | 705/50 |
| 2012/0278728 | A1* | 11/2012 | Malin .............. H04N 21/47202 |
| | | | 715/748 |
| 2014/0052825 | A1* | 2/2014 | Luecke .............. H04L 67/1097 |
| | | | 709/219 |
| 2016/0323262 | A1* | 11/2016 | Tan .................... H04L 63/0846 |
| 2017/0048117 | A1 | 2/2017 | Tsuchiya et al. |

FOREIGN PATENT DOCUMENTS

| | | |
|---|---|---|
| JP | 2014-98981 | 5/2014 |
| JP | 2014-238824 | 12/2014 |
| JP | 2015-537291 | 12/2015 |
| JP | 2017-37482 | 2/2017 |
| KR | 10-2013-0024668 | 3/2013 |
| KR | 10-2015-0067643 | 6/2015 |

\* cited by examiner

METHOD AND SYSTEM FOR WIRELESSLY CONNECTING DEVICES

CROSS REFERENCE TO RELATED APPLICATION

This application claims priority from and the benefit of Korean Patent Application No. 10-2017-0088512, filed on Jul. 12, 2017, which is hereby incorporated by reference for all purposes as if fully set forth herein.

BACKGROUND

Field

Exemplary embodiments/implementations of the invention relate generally to a technology for remote access to electronic devices by wirelessly connecting electronic devices.

Discussion of the Background

Generally, data may be transmitted and received by connecting cables between devices. In the Internet environment, data may be transmitted and received without connecting cables between devices by using email or chat service. More particularly, after files are uploaded through a Send file function provided in a chat service on one device, the files may be downloaded and read by connecting to the chat service on another device. According to this process, it is difficult to confirm whether files are normally transmitted to a device from another device, and there is an inconvenience that each of devices has to transmit and download files one by one.

Meanwhile, data which was stored in devices (e.g., desktops, laptops, portable devices, and the like) may be stored in cloud storage on the Internet, and users may use the data stored in cloud storage anywhere and at anytime by using their accounts as needed.

Accordingly, it would be desirable to have a technology for wirelessly connecting devices capable of remote access through a cloud drive service.

The above information disclosed in this Background section is only for understanding of the background of the inventive concepts, and, therefore, it may contain information that does not constitute prior art.

SUMMARY

At least one exemplary embodiment of the inventive concept may provide a method and system for integrally managing files in a cloud drive service by wirelessly connecting a plurality of cloud storages and a plurality of electronic devices.

Furthermore, at least one exemplary embodiment may provide a wireless connecting system and method that are able to inquire and read a list by connecting to electronic devices without a separate cable through remote access between electronic devices.

Additional features of the inventive concepts will be set forth in the description which follows, and in part will be apparent from the description, or may be learned by practice of the inventive concepts.

According to one or more exemplary embodiments of the invention, a method for wirelessly connecting devices performed in a wireless connection system implemented with a computer includes: providing a list of devices capable of remote access with a user account of a user; connecting devices based on the list of devices capable of remote access; automatically updating a list of folders in the connected devices and a list of files included in the folders; and integrally managing files included in the connected devices.

The integrally managing of the files may include: providing a file directory of the connected devices.

The integrally managing of the files may include: in response to a first electronic device attempting to access a second electronic device among the connected devices, authorizing the first electronic device to read file directory in the second electronic device.

The integrally managing of the files may include: in response to the first electronic device requesting a file included in a second electronic device, receiving the requested file from the second electronic device; and downloading the requested file to a local drive of the first electronic device by transmitting the requested file received from the second electronic device to the first electronic device.

The integrally managing of the files may include: uploading a file selected from the provided file directory of the connected devices to a network drive configured with the user account, and wherein the network drive configured with the user account may include interconnecting cloud storages on at least one server used by the user, and integrally managing the interconnected cloud storages.

The integrally managing of the files may include: in response to a first electronic device requesting a file included in the second electronic device, receiving a file included in the second electronic device which is requested from the first electronic device from the second electronic device as the file included in the second electronic device is requested to upload to the network drive from the first electronic device among the connected devices, and uploading the file received from the second electronic device to the network drive.

The integrally managing of the files may include: in response to receiving a request to upload the requested file from the first electronic device, downloading the requested file to the network drive from the first electronic device among the connected devices, downloading the requested file from the first electronic device through the network drive, and transmitting the downloaded file to the local drive of the first electronic device.

The integrally managing may include providing progress state of instructions requested from the first electronic device or the second electronic device.

The connecting of the devices may include: connecting one device; releasing mapping with the one device connected to the user account; and deleting the mapping on the list of devices capable of remote access.

The connecting of the devices may include: providing a file and folder list of the connected devices to be accessible according to connection state of the connected devices.

The integrally managing may include: classifying files stored in the connected devices into predetermined types; and providing a list of the classified files.

The integrally managing may include: providing an editing function of folders or files in the connected devices and an editing function of folders or files stored in the cloud storages through the network drive configured on the user account.

The integrally managing may include: authorizing access to a physical drive included in the connected devices.

According to one or more exemplary embodiments of the invention, a computer program stored in a tangible storage medium is provided to implement a method for wirelessly connecting devices, the method for wirelessly connecting including: providing a list of devices capable of remote access with a user account; connecting devices based on the list of devices capable of remote access; automatically updating a list of folders in the connected devices and a list of files included in the folders; and integrally managing files included in the connected.

According to one or more exemplary embodiments of the invention, a wireless connection system implemented with a computer includes: a providing unit configured to provide a list of devices capable of remote access with a user account of a user; a connecting unit configured to connect devices based on the list of devices capable of remote access; an updating unit configured to automatically update a list of folders in the connected devices and a list of files included in the folders; and a managing unit configured to integrally manage files included in the connected devices.

The managing unit may be configured to: provide a file directory of the connected devices; and in response to a first electronic device attempting to access a second electronic device among the connected devices, authorize the first electronic device to read file directory in the second electronic device.

The managing unit may be configured to: in response to the first electronic device requesting a file included in the second electronic device, receive the requested file from the second electronic device; and download the requested file to a local drive of the first electronic device by transmitting the requested file received from the second electronic device to the first electronic device.

The managing unit may be configured to upload a file selected from the provided file directory of the connected devices to a network drive configured with the user account, and the network drive configured with the user account may be configured to: interconnect cloud storages on at least one server used by the user; and integrally manage the interconnected cloud storages.

The managing unit may be configured to: in response to the first electronic device requesting a file included in the second electronic device, receive the requested file from the second electronic device; and upload the requested file received from the second electronic device to the network drive.

The system of claim 18, wherein the managing unit, in response to receiving a request to upload a file from the first electronic device to the network drive, may be configured to download the requested file requested from the first electronic device through the network drive; and transmit the downloaded file to a local drive of the first electronic device. It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

DETAILED DESCRIPTION

Figure 1:
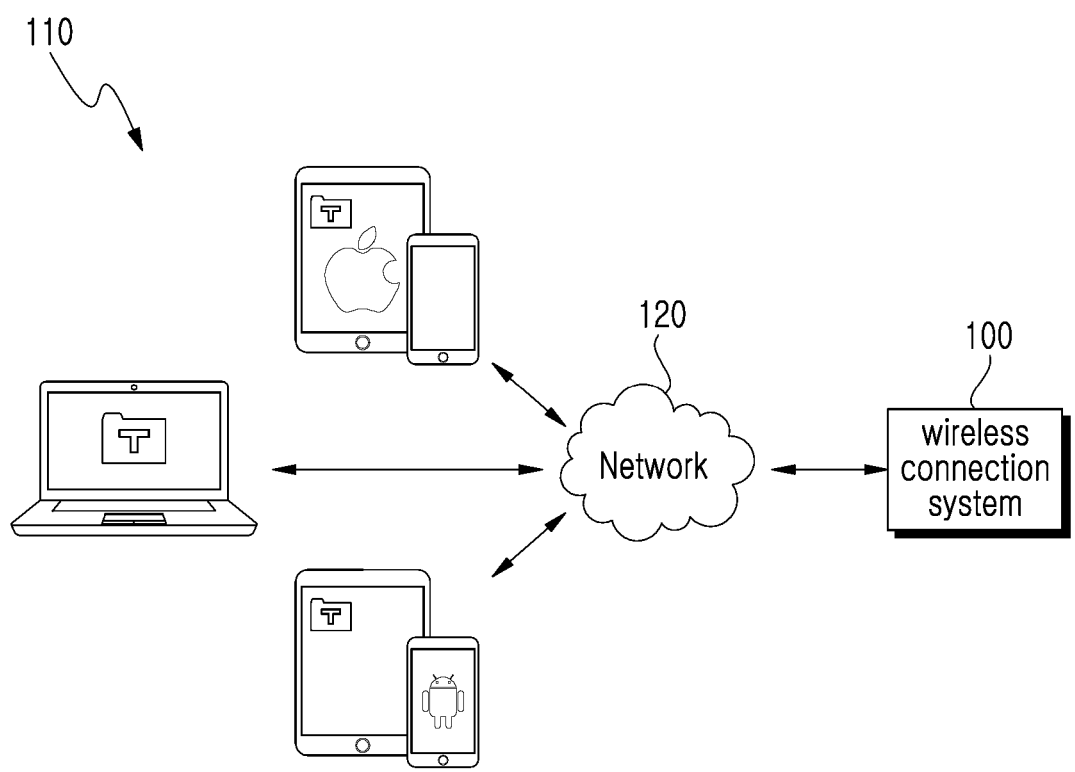
FIG. 1 illustrates an example of a network environment according to an exemplary embodiment.

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

In the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element is referred to as being "on," "connected to," or "coupled to" another element, it may be directly on, connected to, or coupled to the other element or intervening elements may be present. When, however, an element is referred to as being "directly on," "directly connected to," or "directly coupled to" another element, there are no intervening elements present. To this end, the term "connected" may refer to physical or electrical connection, with or without intervening elements. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Hereinafter, some exemplary embodiments will be described in detail with reference to the accompanying drawings.

FIG. 1 illustrates an example of a network environment according to an exemplary embodiment.

A network environment of FIG. 1 represents an example including a device 110, a wireless connection system 100, and a network 120.

The device 110 may be a fixed terminal implemented by a computer device or a portable terminal. For example, the device 110 may include a smart phone, a mobile phone, a navigation, a computer, a laptop, a digital broadcasting terminal, a PDA (Personal Digital Assistants), a PMP (portable Multimedia Player), a tablet PC, and the like. For example, the device 110 may communicate with other devices and/or servers by using wireless or wired communication method.

The communication method is not limited and may include not only a communication method utilizing communication network (e.g. mobile communication network, the wired Internet, the wireless Internet, and broadcasting network) that the network 120 may include but also short-range wireless communication. For example, the network 120 may include any one or more network among networks of PAN (personal area network), LAN (local area network), CAN (campus area network), MAN (metropolitan area network), WAN (wide area network), BBN (broadband network), the Internet, and the like. Also, the network 120 may include any one or more among network topologies including bus network, star network, ring network, mesh network, star-bus network, tree or hierarchical network, and the like, but it may not be limited thereto.

The wireless connection system 100 may be implemented with a computer device or a plurality of computer devices providing an instruction, a code, a file, content, a service, and the like by communicating through the device 110 and the network 120. For example, the wireless connection system 100 may provide a file for installing an application to the device 110 connected through the network 120. In this case, the device 110 may install an application by using the file provided from the wireless connection system 100. Also, according to control of OS (Operating System) included in the device 110 or at least one program (e.g. browser or the installed application), services or contents provided by the wireless connection system 100 may be provided by connecting to the wireless connection system 100.

As an example, a cloud drive service may be installed on the device 110. For example, a cloud drive service may be installed on the device 110 based on a platform or an application running on the device 110. The cloud drive service provides a meta service for cloud storages by interconnecting a plurality of cloud storages to a user account, and acts as a bridge device mediating between devices to transmit and receive files without a separate cable by wirelessly connecting electronic devices capable of remote access with the user account.

Figure 2:
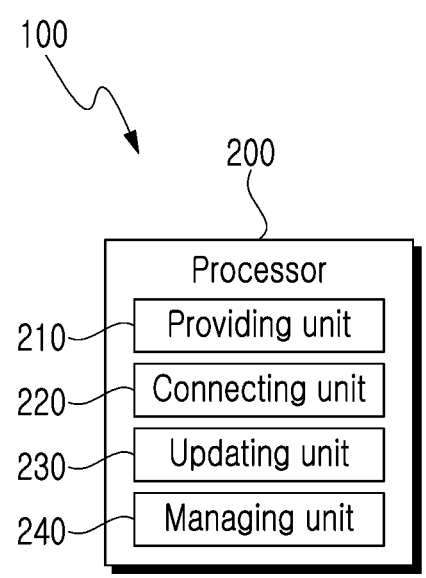
FIG. 2 is a block diagram configuration of a wireless connection system according to an exemplary embodiment.
Figure 3:
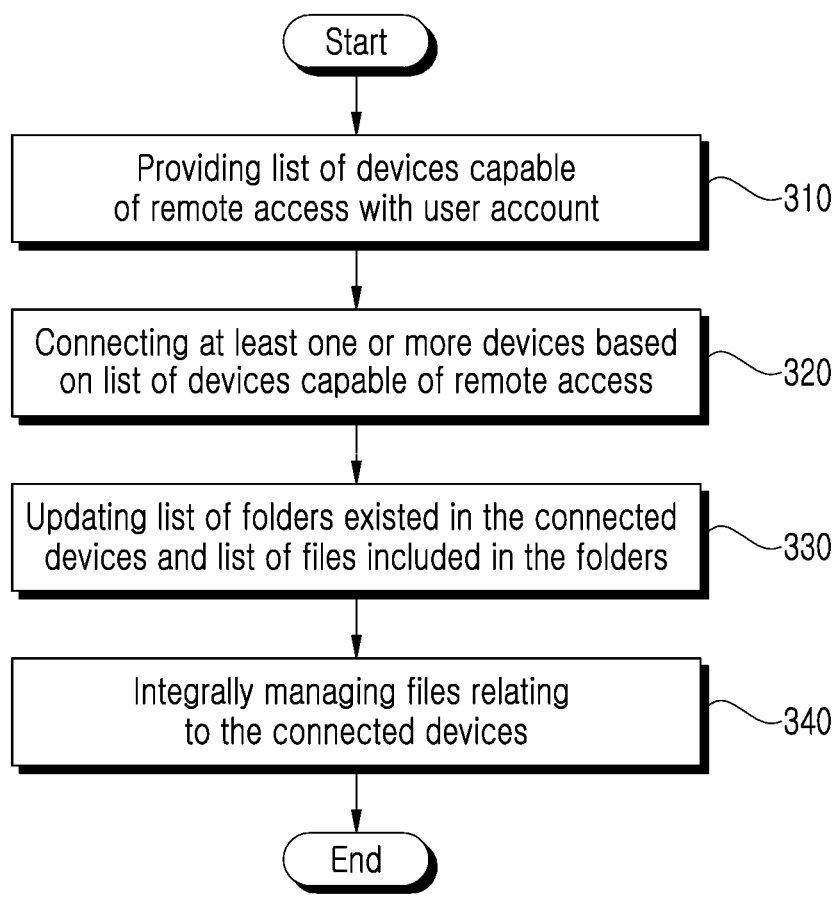
FIG. 3 is a flow chart illustrating a method for wirelessly connecting devices in a wireless connection system according to an exemplary embodiment.

FIG. 2 is a block diagram configuration of a wireless connection system according to an exemplary embodiment, and FIG. 3 is a flow chart illustrating a method for wirelessly connecting between devices in a wireless connection system according to an exemplary embodiment.

A processor 200 of the wireless connection system 100 which is for providing remote access of a device through a cloud drive service may include a providing unit 210, a connecting unit 220, an updating unit 230, and a managing unit 240. According to exemplary embodiments, components of the processor 200 may be selectively included or excluded in the processor 200. Also, according to exemplary embodiments, the components of the processor 200 may be separated or combined to express functions of the processor 200.

The processor 200 and the components of the processor 200 may control the wireless connection system 100 to perform operations 310, 320, 330, and 340 included in a method for wirelessly connecting of FIG. 3. Here, the processor 200 and the components of the processor 200 may be implemented to execute instructions in accordance with OS code included in a memory and at least one program code. Here, the components of the processor 200 may be expressions of different functions performed by the processor 200 in accordance with control instructions provided by program code stored in the wireless connection system 100.

The processor 200 may load program code stored in a program file for a method for wirelessly connecting to the memory. For example, when running a program in the wireless connection system 100, the processor may control the wireless connection system to load the program code to the memory from the program file according to control of OS.

In operation 310, the providing unit 210 may provide a list of devices capable of remote access with a user account.

In operation 320, the connecting unit 220 may connect at least one or more devices based on the devices capable of remote access. For example, the connecting unit 220 may connect devices which state is on to the user account based on the list of devices capable of remote access provided to a cloud drive service according to the user account, or may connect a selected device to the user account as at least one device is selected from the user among the list of devices capable of remote access provided to the cloud drive service. Also, the connecting unit 220 may release mapping with the device connected to the user account and delete the mapping on the list of devices capable of remote access.

In operation 330, the updating unit 230 may automatically update a list of folders existing in the connected devices and a list of files included in the folders. The updating unit 230 may automatically update state of devices and the list in the devices by confirming whether access authority of the connected devices is valid. When the access authority of the connected devices is not valid, the updating unit 230 may automatically update the state of devices and the list of devices. When the access authority of the connected devices is valid, the updating unit 230 may automatically update remote access state, and automatically update the list of folders and the list of files included in the folders according to updating the remote access state.

In operation 340, the managing unit 240 may integrally manage files relating to the connected devices. Hereinafter, the files relating to the connected devices includes files included in the connected devices, but the exemplary embodiments are not limited thereto. The managing unit 240 may provide file directory relating to the connected devices. Hereinafter, the file directory relating to the connected devices includes the file directory of the connected devices, but the exemplary embodiments are not limited thereto. The managing unit 240 may, in response to a first electronic device attempting to access a second electronic device among the connected devices, authorize the first electronic device to read file directory in the second electronic device. Here, the managing unit 240 may provide the file/folder list of the connected devices to be accessible according to connection state of the connected devices.

For example, in response to the first electronic device requesting a file relating to the second electronic device, the managing unit 240 may receive the requested file from the second electronic device, and download the requested file to a local drive of the first electronic device by transmitting the requested file received from the second electronic device to the first electronic device. Here, the managing unit 240 may provide progress state of instructions requested from the first electronic device or the second electronic device.

For example, the managing unit 240 may upload a file selected from the provided file directory relating to the connected devices to a network drive configured with the user account. In response to the first electronic device requesting an upload of a file relating to the second electronic device to the network drive, the managing unit 240 may receive the requested file relating to the second electronic device from the second electronic device, and upload the requested file received from the second electronic device to the network drive. Also, the managing unit 240 may receive a request to download the file uploaded to the network drive from the first electronic device among the connected devices, download the requested file through the network drive, and transmit the downloaded file to the local drive of the first electronic device.

Figure 4:
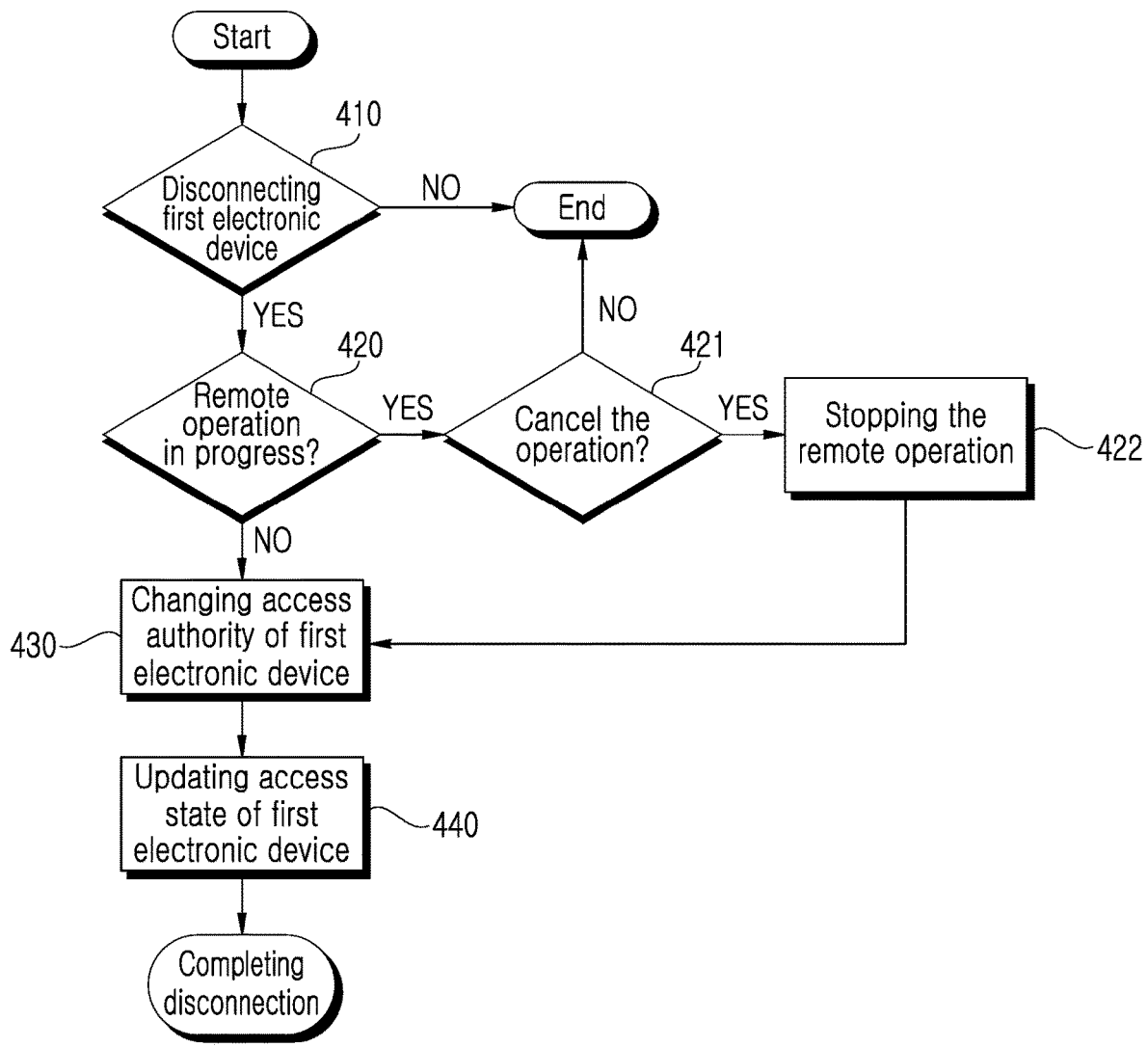
FIG. 4 is a flow chart illustrating a method for disconnecting connected devices in a wireless connection system according to an exemplary embodiment.

FIG. 4 is a flow chart illustrating a method for disconnecting connected devices in a wireless connection system according to an exemplary embodiment.

A wireless connection system may provide wireless connection between devices through a cloud drive service. Here, the cloud drive service may be installed on each platform of devices. The cloud drive service may mean a space integrally providing a network drive function for interconnecting at least one or more cloud storages used by a user and integrally managing the interconnected cloud storages and a function for wirelessly connecting devices.

A user may log on to the cloud drive service with a user account. The cloud drive service may provide a list of devices capable of remote access with the user account. Here, the cloud drive service should be installed on each of devices, and wireless connecting setting and activation state should be on. The user may select at least one or more devices to be wirelessly connected from the list of devices capable of remote access. The wireless connection system may connect the selected devices. Accordingly, the wireless connection system may download files/folders stored in the present using device to another device connected to the drive service through the cloud drive service, and download files/folders in another device connected to the drive service to the present using device. In other words, the wireless connection system may provide data to be transmitted and received through remote access between at least one or more devices connected to the cloud drive service.

Meanwhile, the wireless connection system may change connection state of devices connected to the cloud drive service. For example, the user may disconnect the devices connected to the cloud drive service. The wireless connection system may receive the disconnection of at least one or more devices among the devices connected to the cloud drive system. In FIG. 4, a method for disconnecting of the first electronic device connected to the cloud drive service will be described.

The wireless connection system may determine whether the connection of the first electronic device is disconnected 410. Here, when the first electronic device is not disconnected, the process may be ended. When the first electronic device is disconnected, the wireless connection system may determine whether a remote operation on the first electronic device is in progress as the first electronic device is disconnected 420. For example, the remote operation from the first electronic device to the second electronic device may be in progress, and the remote operation from the second electronic device to the first electronic device may be in progress sand a file may be in moving to the first electronic device. Here, when the remote operation is in progress on the first electronic device, the wireless connection system may query whether to cancel the remote operation 421. The wireless connection system may end the process on receiving a response that the remote operation will not be canceled from the user, and may cease the remote operation on receiving a response that the remote operation will be canceled from the user 422. The wireless connection system may change access authority of the first electronic device as the remote operation of the first electronic device is ceased 430.

The wireless connection system may change access authority of the first electronic device as it is determined that the remote operation is not in progress on the first electronic device 430. Here, the access authority may include setting the first electronic device not to be wirelessly connected to other devices in the list of devices capable of connecting. For example, the wireless connection system may change network connection setting and activation state of the first electronic device to off.

The wireless connection system may automatically update access state of the first electronic device as the access authority of the first electronic device is changed 440. Here, the first electronic device provided as the list capable of remote access to each of devices connecting to the cloud drive service with the user account may be deleted, and a list of folders relating to the first electronic device and a list of files included in the folders may not be provided. Accordingly, the wireless connection system may complete disconnection of the first electronic device.

Figure 5:
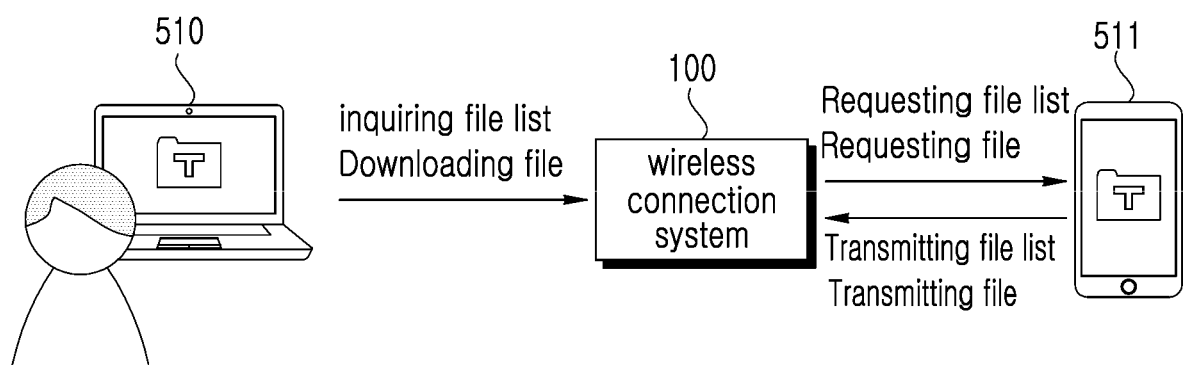
FIG. 5 is a drawing for describing a method for moving files between devices in a wireless connection system according to an exemplary embodiment.

FIG. 5 is a drawing for describing a method for moving files between devices in a wireless connection system according to an exemplary embodiment.

In FIG. 5, a process for transmitting files between a first electronic device 510 and a second electronic device 511 which are connected with a user account will be described. Here, the first electronic device 510 and the second electronic device 511 may be the same or different kind of device. For example, FIG. 5 illustrates that the first electronic device 510 is a desktop and the second electronic device 511 is a mobile device. More particularly, the first electronic device 510 may be a device driven with Windows, and the second electronic device 511 may be a device driven with Android or IOS. However, the exemplary embodiments are not limited thereto. A wireless connection system may provide a list of devices capable of remote access according to a user account connected to a cloud drive service and a list of folders/files existing in the devices.

The wireless connection system may receive that a list of files relating to the second electronic device 511 is inquired from the first electronic device 510. The wireless connection system may request the list of files relating to the second electronic device 511 to the second electronic device 511. The second electronic device 511 may extract the list of files inquired from the first electronic device and transmit the extracted list to the wireless connection system. The wireless connection system may receive the list of files transmitted from the second electronic device 511. Likewise, the wireless connection system may provide the list of files and the list of folders not by saving original data of devices connected to the user account, but by saving meta data.

Download of files relating to the second electronic device 511 may be requested from the first electronic device 510. The wireless connection system 100 may request information relating to the files requested from the first electronic device 510 to the second electronic device 511. The second electronic device 511 may transmit the files requested from the first electronic device 510 to the wireless connection system 100. The wireless connection system 100 may receive information relating to the files transmitted from the second electronic device 511. The wireless connection system 100 may provide the files requested from the first electronic device 510 through a cloud drive service. The wireless connection system may download the files to a local drive of the first electronic device 510.

According to an exemplary embodiment, the wireless connection system may upload/download files or folders more easily by remotely accessing to electronic devices connected to the user account even though the electronic devices to be remotely accessed are not used.

Figure 6:
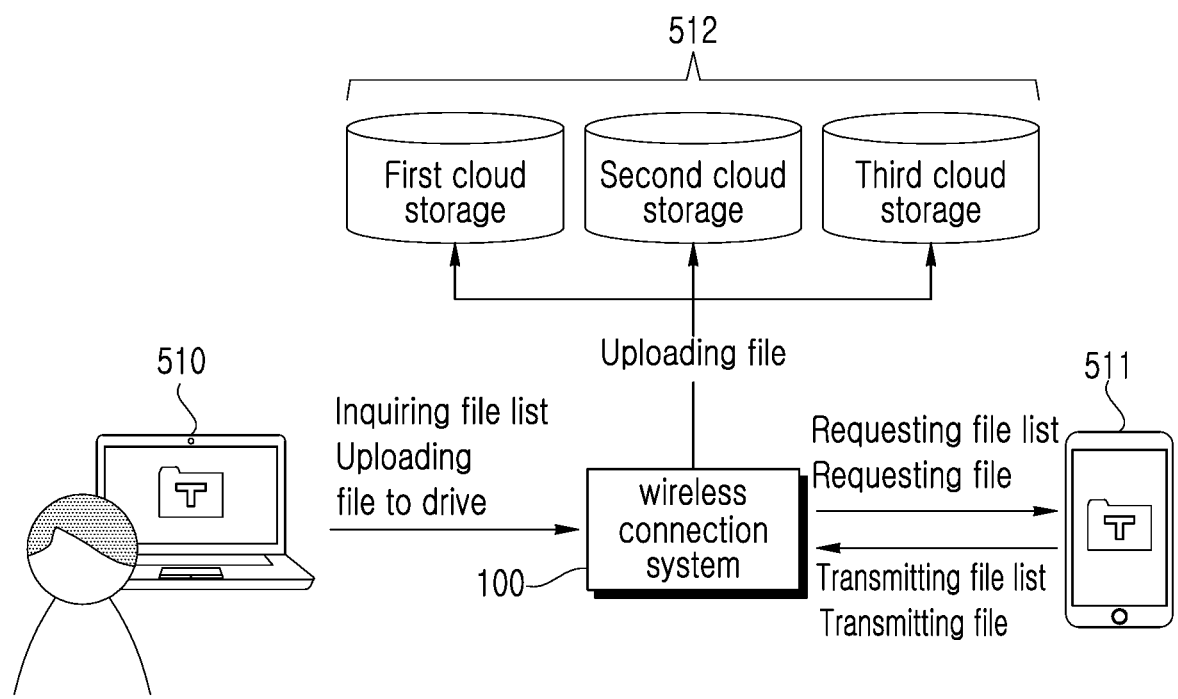
FIG. 6 is a drawing for describing a method for uploading files to network drive in a wireless connection system according to an exemplary embodiment.

FIG. 6 is a drawing for describing a method for uploading files to network drive in a wireless connection system according to an exemplary embodiment.

The wireless connection system 100 may configure a network drive integrally managing a plurality of cloud storages including a first cloud storage, a second cloud storage, and a third cloud storage 512 with a user account through a cloud drive service. For example, the plurality of cloud storages may include cloud storage services such as Google Drive, Dropbox and the like used with identification information (e.g., email address, ID and password, and the like) of a user in each cloud drive service are interconnected to a network drive of a cloud drive service 700 suggested in an exemplary embodiment. Regarding this, the cloud drive service 700 configuring the network drive will be described in detail in FIG. 7.

A process for uploading files between the first electronic device 510 and the second electronic device 511 connected with a user account to the network drive will be described. The wireless connection system 100 may receive that a list of files relating to the second electronic device 511 is inquired from the first electronic device 510. The wireless connection system 100 may request the list of files relating to the second electronic device 511 to the second electronic device 511. The wireless connection system 100 may receive the list of files transmitted from the second electronic device 511.

The first electronic device 510 may request files in the second electronic device 511 to upload to the network drive. The wireless connection system 100 may request to transmit the files to the second electronic devices 511 as it is determined that files requested from the first electronic device 510 exist in the second electronic device 511. The second electronic device 511 may transmit the files to the wireless connection system 100, and the wireless connection system 100 may receive the files transmitted from the second electronic device 511. The wireless connection system 100 may upload the files received from the second electronic device 511 to the network drive. Here, the files may be uploaded to at least one cloud storage among a plurality of cloud storages configured in the network drive.

Figure 7:
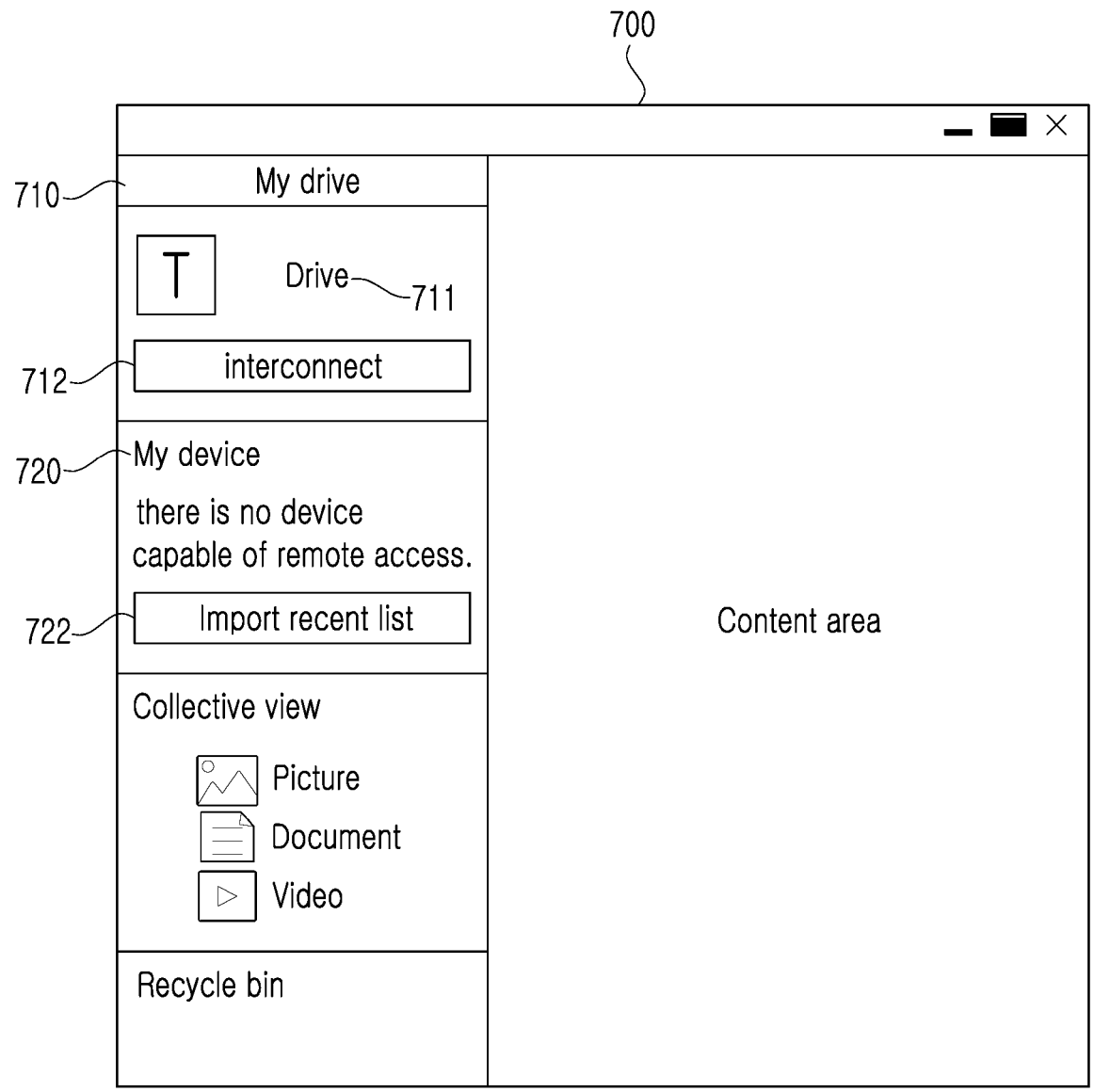
FIG. 7 illustrates an example of a cloud drive service provided in a wireless connection system according to an exemplary embodiment.

FIG. 7 illustrates an example of a cloud drive service provided in a wireless connection system according to an exemplary embodiment.

In FIGS. 7, 8, 9, 10, 11, 12, 13, 14, 15, 16, 17, 18, 19, and 20, a user interface integrally managing files through a cloud drive service may be provided. Editing function of folders or files in connected devices through the cloud drive service and editing function of folders or files stored in a cloud storage through a network drive configured in a user account may be provided. More particularly, function for editing files may be performed such as reading file directory, uploading files to cloud space of the network drive, downloading files to a local, deleting and moving files, and the like through the cloud drive service.

The wireless connection system 100 may provide a list of network drives configured based on a plurality of cloud storages and a list of devices capable of wirelessly connecting through the cloud drive service 700. A user may wirelessly connect devices and transmit and receive data between the wirelessly connected devices as well as easily access to the cloud storage through the cloud drive service 700. Furthermore, the data transmitted and received between wirelessly connected devices may be uploaded to the cloud storage.

The wireless connection system 100 may configure a virtual network drive which may access to a first cloud storage with a user account. The configured virtual network drive may act a role for reading contents saved in the first cloud storage on the Internet to inside of the cloud drive service 700 of a user account through a network, and also a role for uploading contents stored in an electronic device to the first cloud storage. The wireless connection system 100 may interconnect at least one second cloud storage used by a user and at least one external storage among at least one device relating to the user. The wireless connection system 100 may interconnect drives for each of external storages through the network drive. Here, the second cloud storage is provided from cloud drive service platform on a server which is different a server relating to the first cloud storage, and another cloud storage used by a user, i.e., the second cloud storage may be interconnected through the cloud drive service 700. The system for wirelessly system may provide open API (Application Programming Interface) for sharing between the network drive and electronic devices.

The wireless connection system may collect and interconnect other devices where an application is installed for the cloud drive service with a user account, or interconnect corresponding devices by registering information of other devices through one device. A list of devices and a list of devices capable of remote access may be displayed on the cloud drive service 700.

The cloud drive service 700 may provide a list of network drives generated as cloud storages that are interconnected to my drive area 710. The cloud drive service 700 may basically include 'drive' folder 711 for accessing to the first cloud storage. A root folder which is 1 depth folder, for example, 'my drive' may be generated, and the 'drive' folder 711 which is a service folder of the first cloud storage provided to a user in the root folder 'my drive' may be generated in the cloud drive service 700.

The cloud drive service 700 may provide a list of devices capable of remote access to my device area 720. A root folder which is 1 depth folder, for example, 'my device' may be generated, and folders for devices capable of remote access in the root folder 'my device' may be generated in the cloud drive service 700. Here, the cloud drive service 700 may output a message such as 'there is no device capable of remote access.' in the my device area 720 when devices capable of remote access do not existed.

Also, the cloud drive service 700 may provide a user interface 712 for additionally interconnecting cloud storages and a user interface 722 for adding devices capable of remote access. The cloud drive service 700 may additionally interconnect cloud storages to the network drive through the user interface 712, and generate service folders for the interconnected cloud storages. Also, the cloud drive service 700 may generate service folders for added devices as devices capable of remote access are added through the user interface 722.

According to an exemplary embodiment, the wireless connection system may provide integrated management environment through interconnecting between services without needing to log in each service by adding other cloud drive services or devices used by a user through the cloud drive service. Also, the wireless connection system may provide a function for immediately revising and saving files after reading the files by providing write function of files existing in devices, and a function for previewing file contents.

As an example, a list of devices capable of remote access to the my device area 720 in the cloud drive service 700 may be displayed in content area. Here, devices displayed in the content area may provide a user interface which may confirm detailed information for each of devices. For example, the cloud drive service 700 may provide name of devices, model name of devices, OS information of devices, used capacity/whole capacity of devices, date when devices are connected, and the like, and provide a user interface providing a function for connecting/disconnecting of devices. Also, the cloud drive service 700 may provide a user interface to change name relating to devices, and may change name relating to devices through the user interface.

Figure 8:
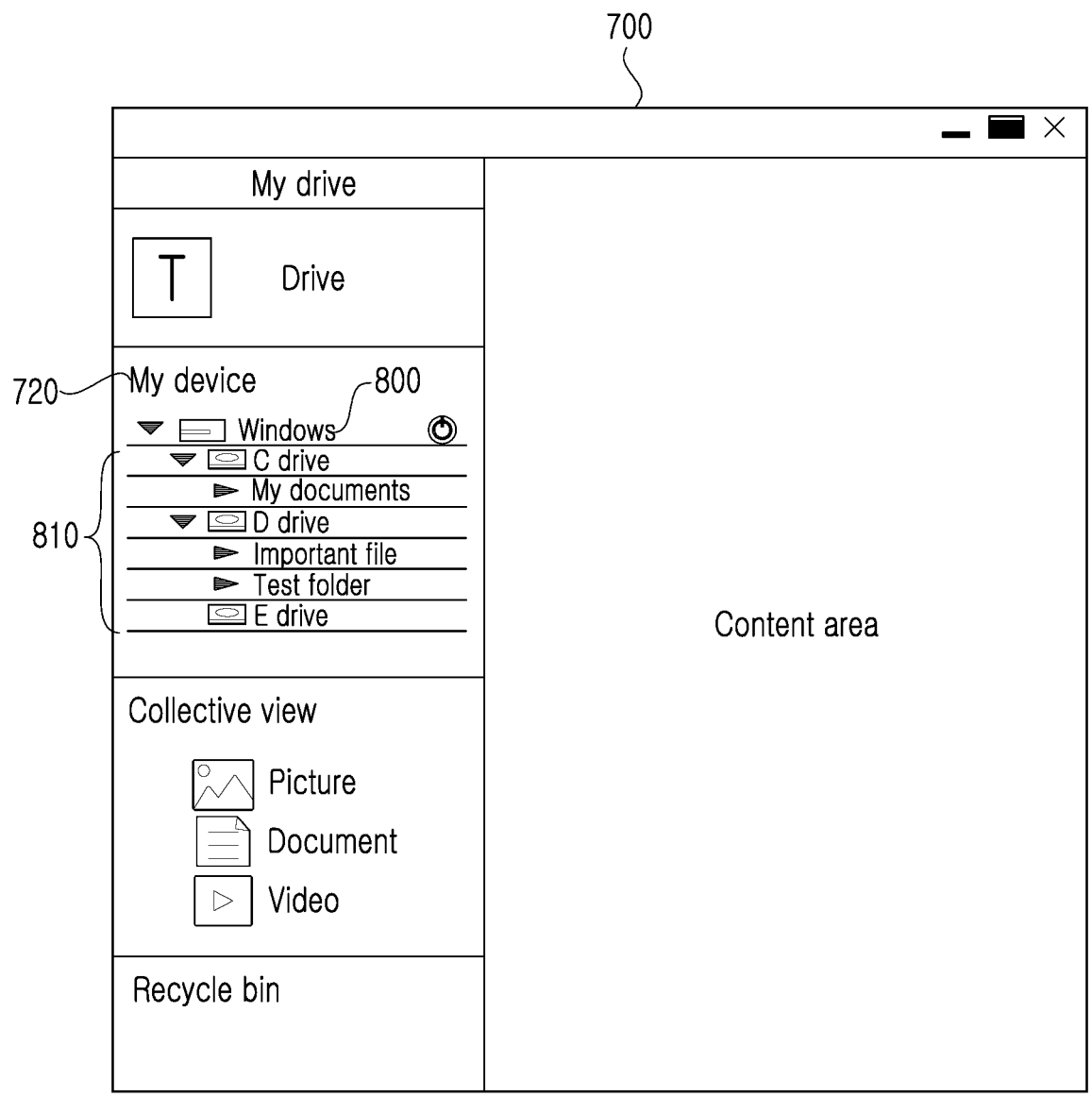
FIGS. 8 and 9 illustrate an example of electronic devices connected in a cloud drive service according to an exemplary embodiment.

Referring to FIG. 8, mobile devices running IOS or Android or/and computers running Windows may be displayed as a list of devices capable of remote access in the my device area 720 of the cloud drive service 700. In other words, service folders for devices capable of remote access to may be displayed in the my device area 720 of the cloud drive service 700. Here, the service folders in the my device area 720 may be displayed as name of devices, and may be changed by a user later. For example, the service folders in the my device area 720 may include name of devices capable of remote access, icon of the devices, device name or model name of the devices, connection state of the devices, and the like. Here, in FIG. 8, it is indicated that windows 800 is displayed as a device capable of remote access to the cloud drive service 700.

A list of drives configured in the windows 800 and a list of folders 810 included in the drives may be displayed in the list of devices capable of remote access provided in my device area 720 of the cloud drive service 700. For example, the cloud drive service 700 may display a local disk (e.g., C drive, D drive, E drive, and the like), and may display a list of folders in each of drives.

Figure 10:
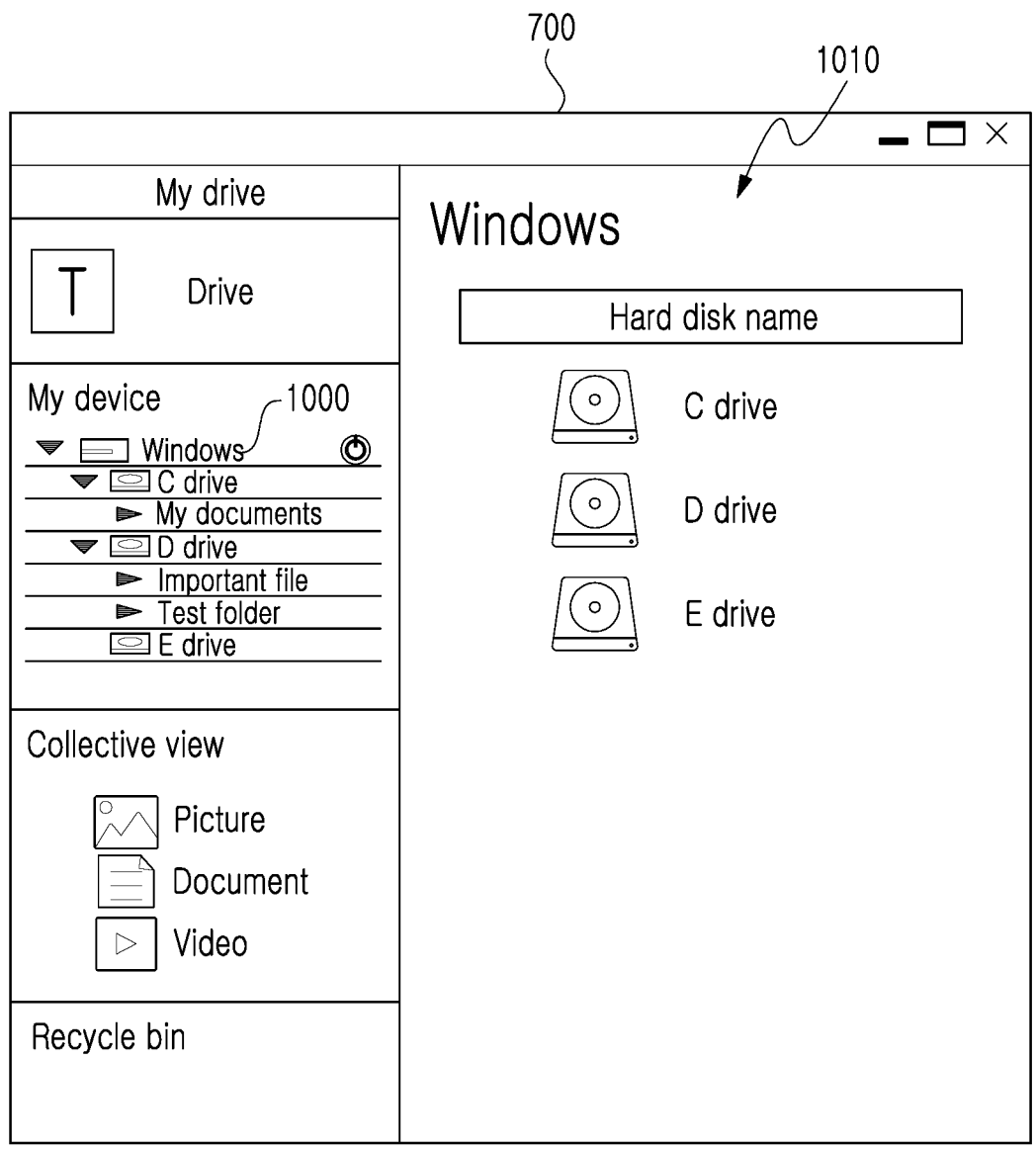
FIGS. 10, 11, 12, and 13 illustrate an example of inquiring a list of electronic devices capable of remote access in a cloud drive service according to an exemplary embodiment.

The windows 800 may be selected in the my device area 720 of the cloud drive service 700. Referring to FIG. 10, the cloud drive service 700 may display a list of drives configured in the windows 800 in a content area 1010. For example, C drive, D drive, and E drive may be displayed in the content area 1010, and displayed with name of each of drives, used capacity/whole used capacity of drives, and the like. Here, as at least one drive is selected by a user, folders and/or files included in the selected drive may be provided.

Figure 9:
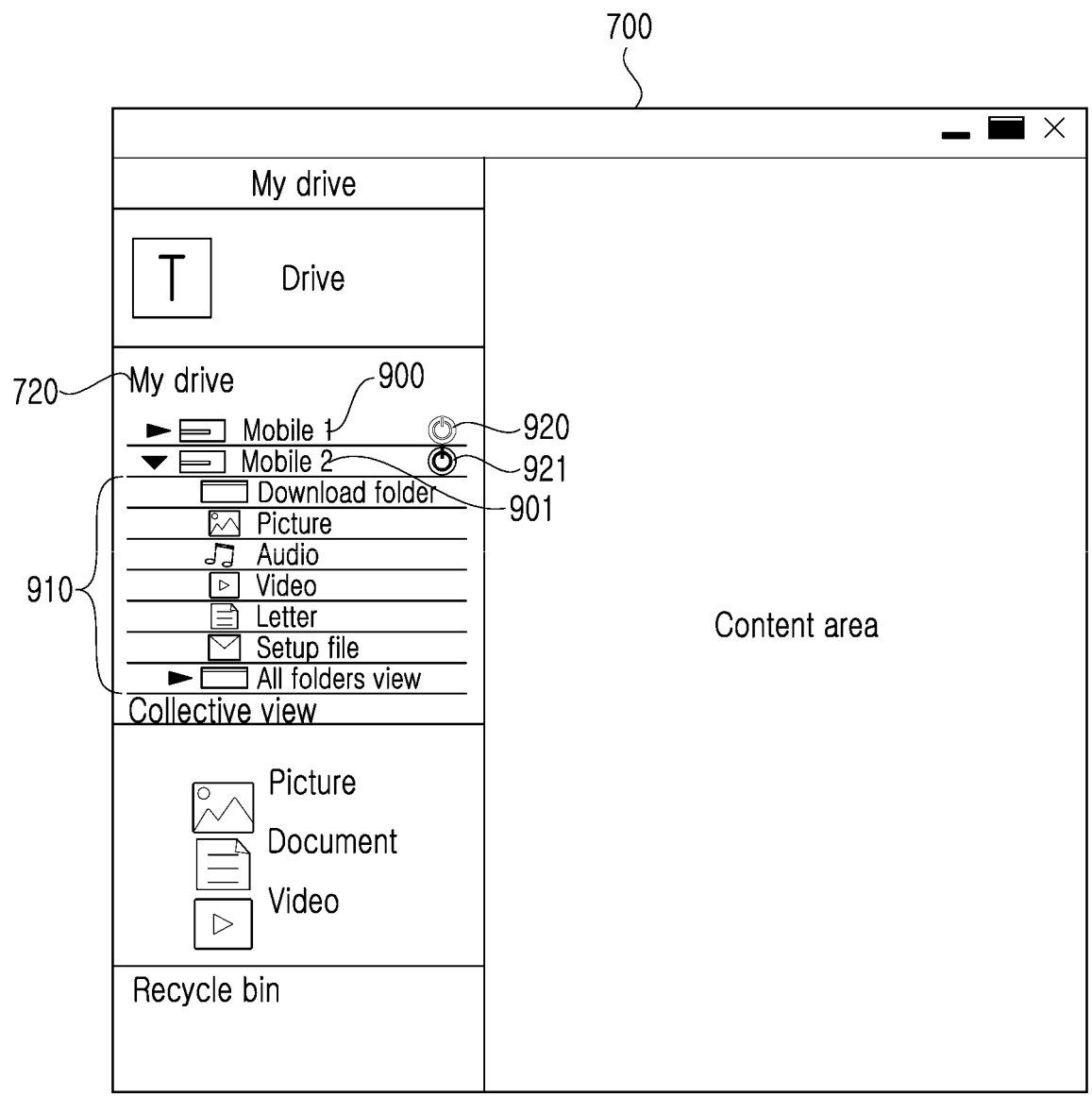

Meanwhile, in FIG. 9, it is indicated that a mobile device is displayed as service folders for devices capable of remote access in the my device area 720 of the cloud drive service 700. The cloud drive service 700 may display connection state of devices capable of remote access. For example, mobile devices 900 and 901 which are devices capable of remote access may be displayed in the cloud drive service 700, and the mobile 1 900 may be displayed in disconnected state 920, and the mobile 2 902 may be displayed in connected state 921.

The cloud drive service 700 may not display a list of folders of the mobile 1 900 which is in disconnected state 920 and a list of files included in the folders even though folders relating to the mobile 1 900 is selected by a user. Here, when a device which is in disconnected state 920 is changed to be in connected state 921, a list of folders of a device which is changed to be in connected state and a list of files included in the folders may be loaded. For example, the cloud drive service 700 may display folders 910 of download folder, picture, audio, video, document, setup file, and the like for the mobile 2 901. Here, as at least one among lists in the mobile 2 901 is selected by a user, information relating to the selected folder may be displayed in the content area.

Figure 11:
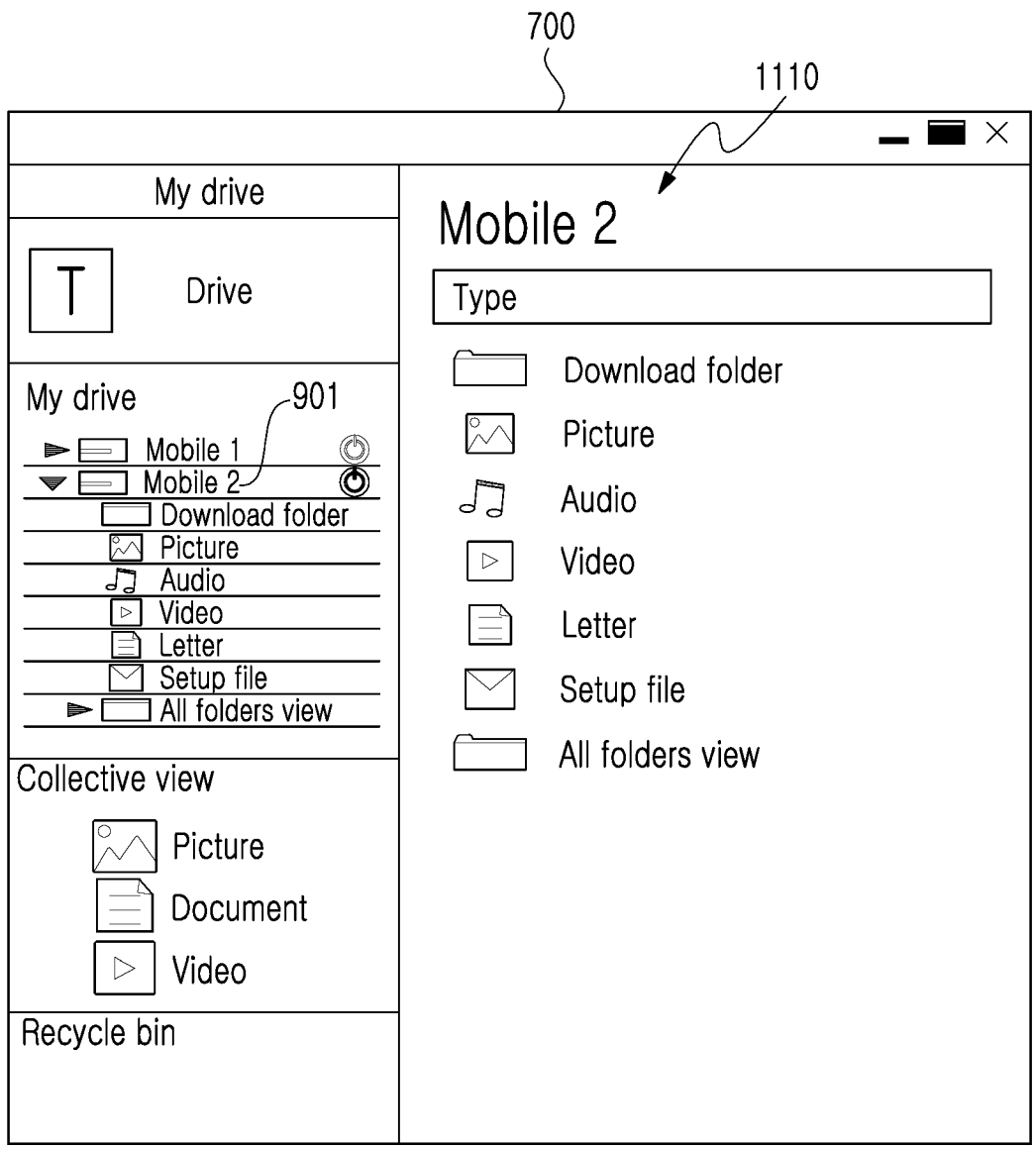

Referring to FIG. 11, the cloud drive service 700 may display a list of folders configured in the mobile 2 901 in a content area 1110. Here, folders such as download folder, picture, audio, video, document, setup file, and the like may be displayed in the content area 1110, and displayed with name of each of folders, name of files included in the folders, capacity of files/folders, date when folders/files are finally revised, check box, and the like. Here, as at least one folder is selected by a user, folders and/or files included in the selected folder may be provided.

Also, in FIGS. 10 and 11, after selecting files/folders displayed in the content areas 1010, 1110 of the cloud drive service, when a specific event (e.g., click right mouse) is inputted, an user interface for selecting to download the selected files or folders, upload to a network drive, and display detailed information may be provided. Or, the cloud drive service may be edited to download the selected files or folders, upload to a network drive, display detailed information, and the like. in response to certain gestures (e.g., Drag&Drop and the like) in the content areas 1010, 1110.

Figure 12:
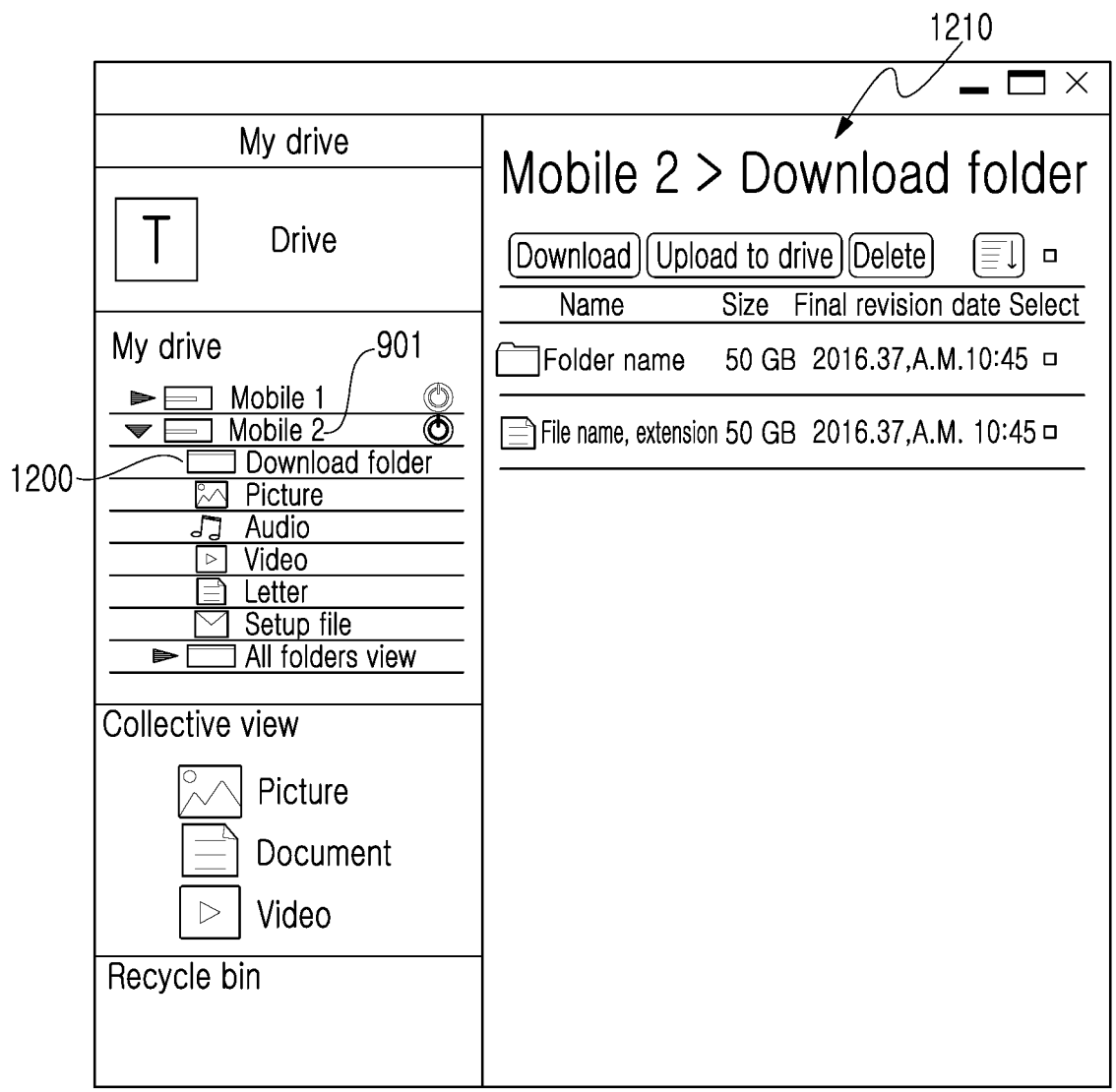

Referring to FIG. 12, a list of folders and files in a download folder of the mobile 2 901 may be displayed in a content area 1210 of the cloud drive service, and displayed with name, size, final revision date, and the like for the displayed folders and files.

Figure 13:
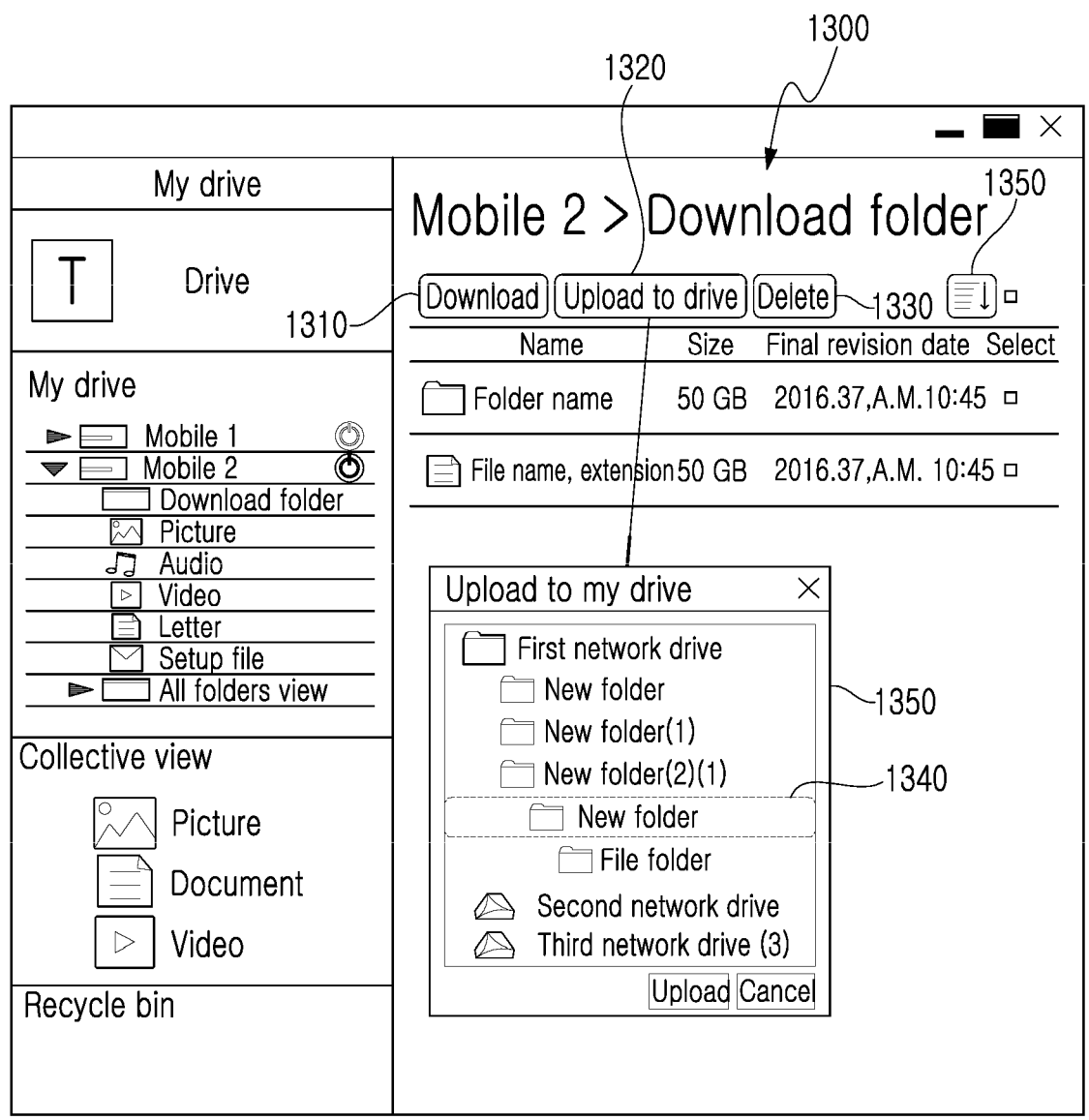

Referring to FIG. 13, a download user interface 1310 for downloading at least one or more folders and files in a download folder of mobile 2, an upload user interface 1320 for uploading the at least one or more folders and files to a network drive, a deleting user interface 1330 for deleting the at least one or more folders and files, and a sorting user interface 1350 for sorting the at least one or more folders and files may be provided to content areas 1210, 1300 of a cloud drive service. Folders and files in a download folder 1200 may be processed to be downloaded, uploaded, and deleted through the user interfaces. Also, files in the download folder may be sorted by predetermined standard (e.g., last revision date, old revision date, size of capacity, ascending order of name, descending order of name, and the like) through the sorting user interface 1350.

More particularly, at least one of folders and files in the download folder of mobile 2 may be selected from a user in the cloud drive service. Then, 'upload to drive' user interface 1320 may be selected to upload the file selected from the user to the network drive. The cloud drive service may provide a user interface 1350 selecting a location for uploading among network drives which are configured with a user account. The user may select a specific folder 1340 among a first network drive. The cloud drive service may upload the file selected from the user to the specific folder 1340 of the first network drive selected from the user. Through this, a file which exists in a device that a user does not use may be uploaded to network drive.

Figure 14:
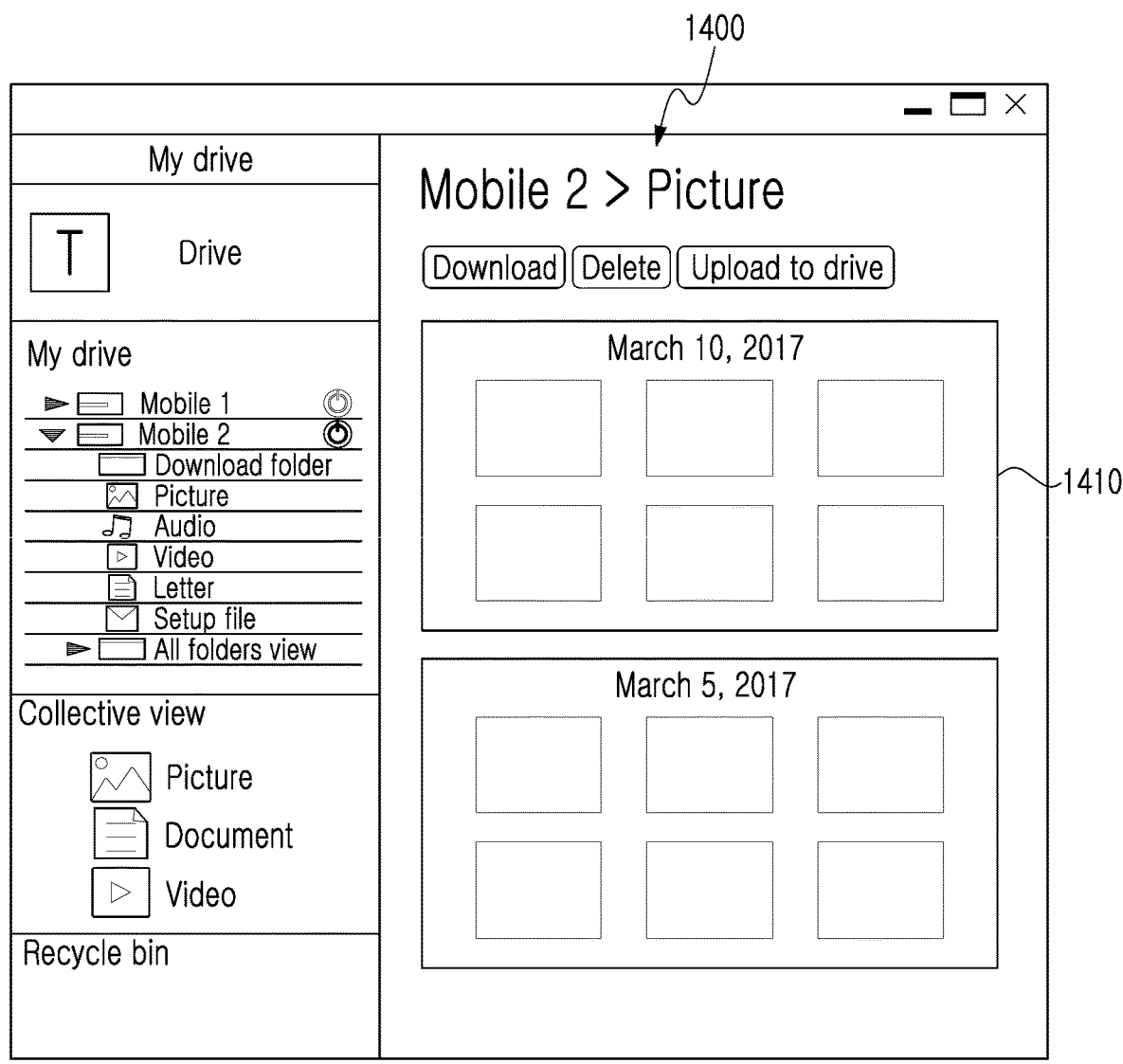
FIGS. 14 and 15 illustrate an example of classifying and displaying files in a cloud drive service according to an exemplary embodiment.
Figure 15:
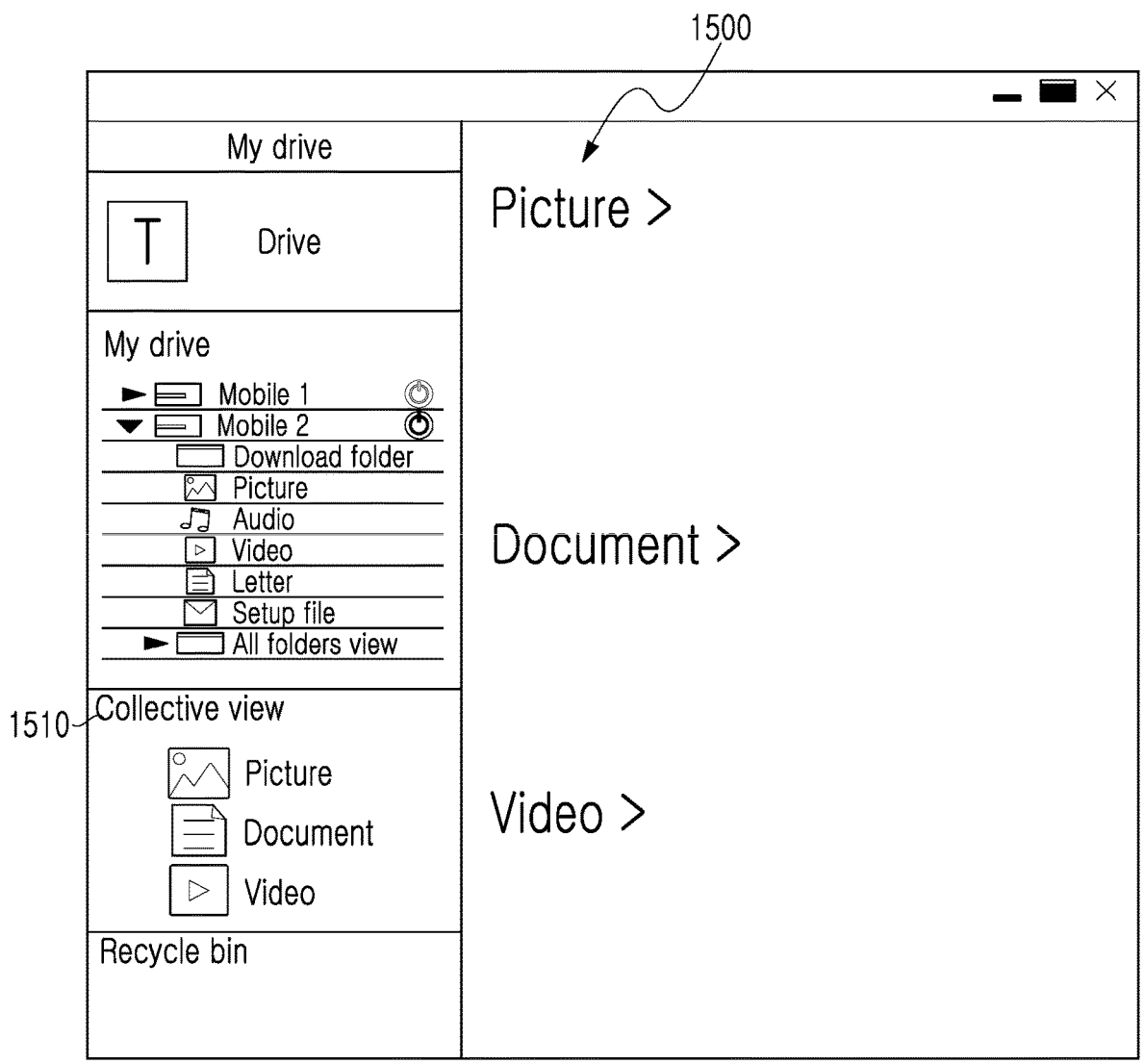

FIGS. 14 and 15 illustrate an example of classifying and displaying files in a cloud drive service according to an exemplary embodiment.

Referring to FIG. 14, a cloud drive service may classify files stored in a connected device by a predetermined type and provide the classified files to a content area 1400. For example, a wireless connection system may classify files in the cloud drive service by picture, video, document, and the like, group the classified files by each of standards and provide the grouped files in a thumbnail form. Or, the files may be classified by date of predetermined standard 1410 and provided. Here, according to kind of device connected to the cloud drive service, files may be classified by predetermined standard and provided, or not provided. For example, when reading files stored in a computer from a mobile device, the files stored in the computer may be classified in picture, video, document, and the like and provided in a cloud drive service connected to the mobile device.

Referring to FIG. 15, a cloud drive service may provide a viewer function for files stored in a network drive. As an example of the viewer function, a collective view function 1510 collecting files stored in the cloud drive service according to kind of files, configuring and exposing a list may be provided. For example, a picture collective view user interface for configuring a picture list by collecting files of picture type in cloud storages and exposing the picture list to a content area 1500, a document collective view user interface for configuring a document list by collecting files of document type and exposing the document list to the content area 1500, a video collective view user interface for configuring a video list by collecting files of video type and exposing the video list to the content area 1500, and the like may be provided. In case of pictures displayed through the content area 1500, it may be provided in a thumbnail form, and picture preview, slide to next/previous picture, rotate picture, and the like may be provided.

Also, the cloud drive service may provide a function for classifying and organizing duplicate pictures. For example, the wireless connection system may group similar pictures based on similarities on composition, color, subject, and the like of pictures, and delete all or part of pictures in the grouping result. As another example, the wireless connection system may classify duplicate pictures by filtering the pictures based on meta information or tag (e.g., date, area, theme, weather, time, and the like), and provide the classified result to a picture list. Likewise, all or part may be deleted in the picture list according to the classified result.

Figure 16:
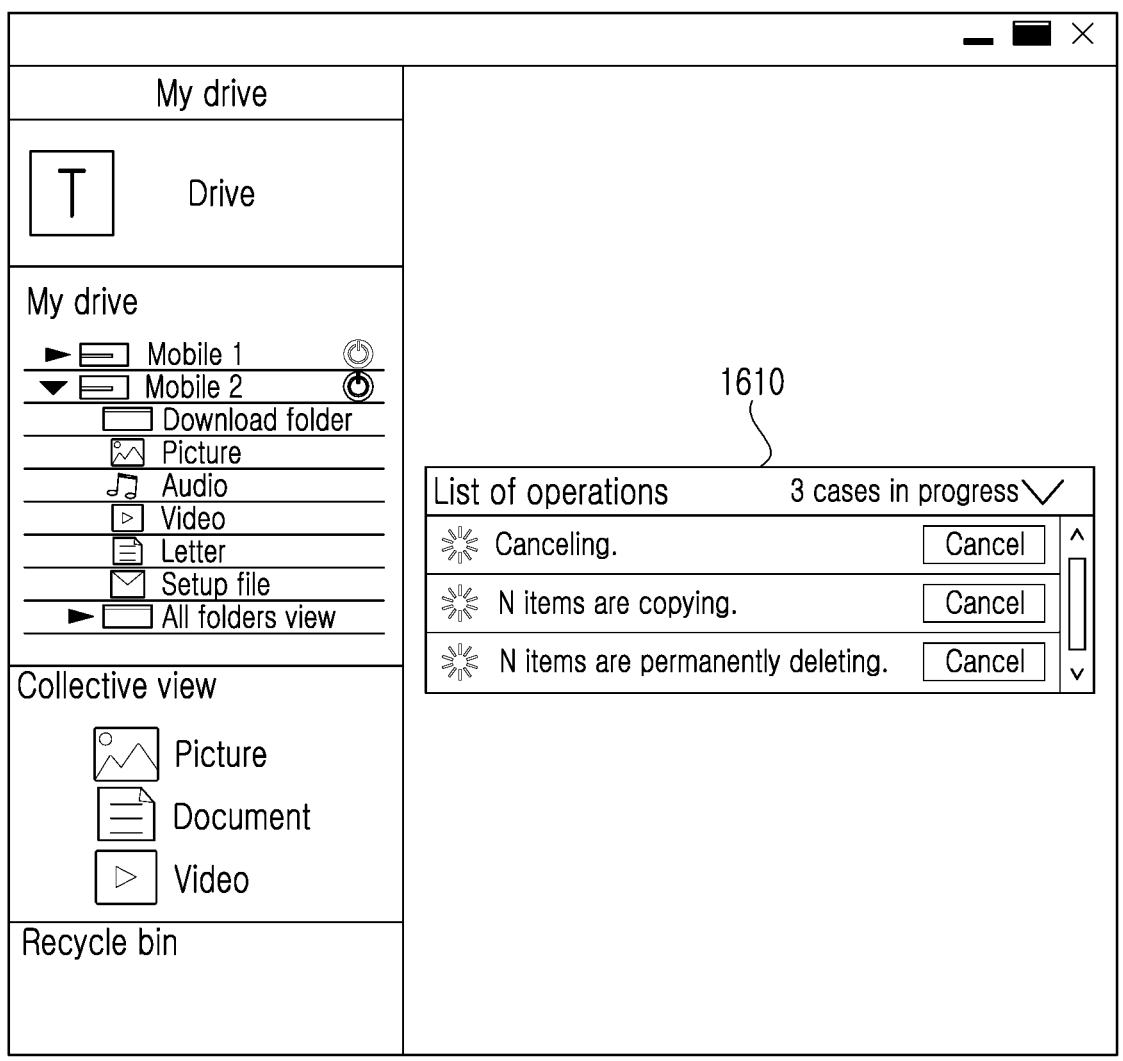
FIG. 16 illustrates an example of displaying progress state of operation in a cloud drive service according to an exemplary embodiment.

FIG. 16 illustrates an example of displaying progress state of operation in a cloud drive service according to an exemplary embodiment.

A cloud drive service may provide progress state relating to instructions requested from a first electronic device or a second electronic device. Hereinafter, the progress state relating to instructions requested includes the progress state of the instructions requested, but the exemplary embodiments are not limited thereto. When downloading a file stored in the second electronic device from the first electronic device, progress state information 1610 of the file downloaded in the first electronic device and the second electronic device may be provided. For example, a message such as 'N items are downloading.' may be outputted through the cloud drive service.

Also, the cloud drive service may provide progress state information for edition such as file upload, file move, file copy, file delete, file revision, and the like as well as file download. Here, the wireless connection system may provide progress state information for the edition through the cloud drive service, and provide progress state information to specific area of each of devices in real-time.

Figure 17:
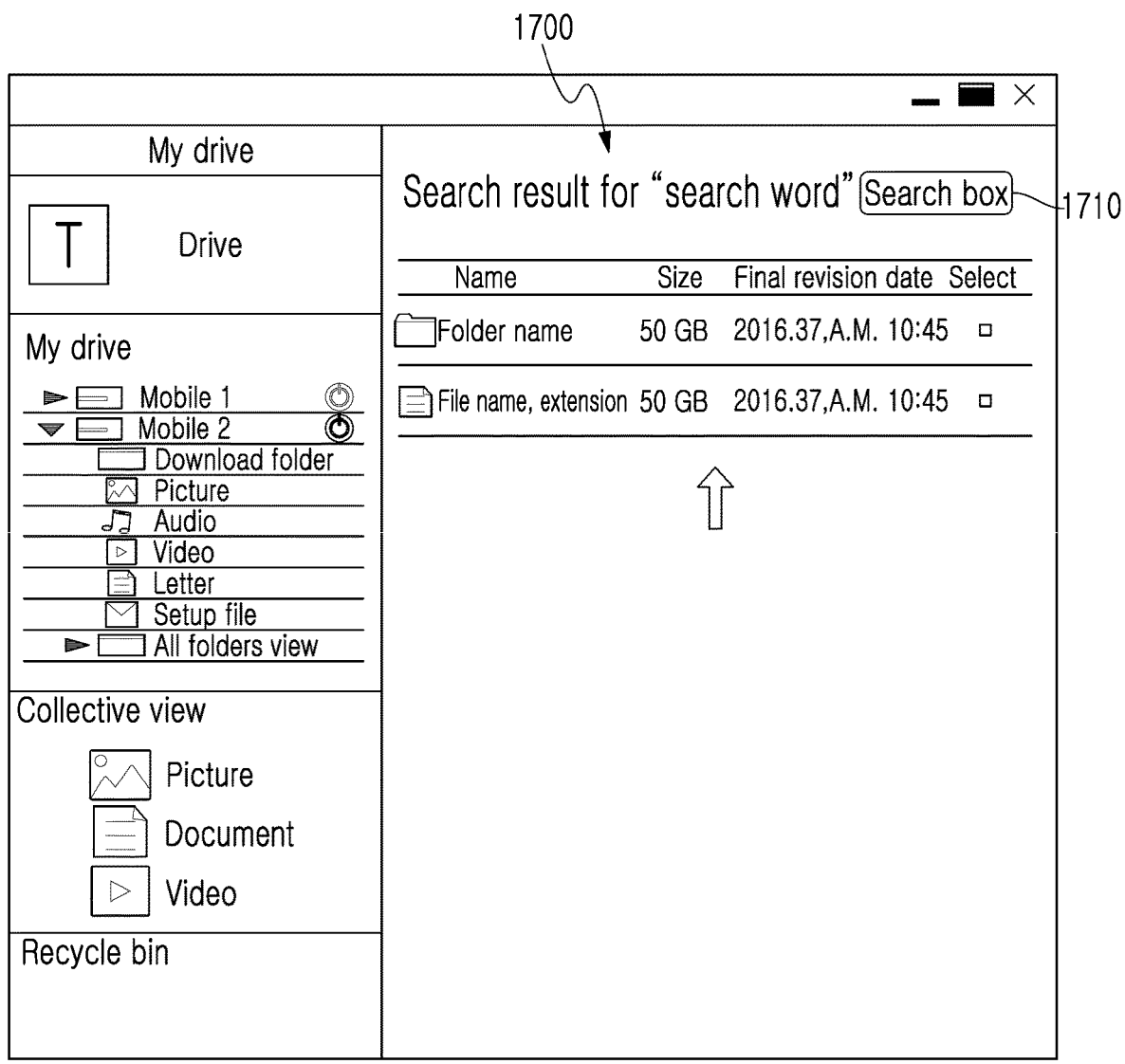
FIG. 17 illustrates an example of displaying search result for search word inputted in a cloud drive service according to an exemplary embodiment.

FIG. 17 illustrates an example of showing search result for search word inputted in a cloud drive service according to an exemplary embodiment.

A cloud drive service may provide an integrated search function for inputting search word. For example, a search box 1710 for searching file name may be provided in a content area 1700. Here, files in a network drive or connected devices may be searched through the cloud drive service. Also, the cloud drive service may provide a function for searching all files in the network drive and the connected devices, and provide a function for searching files at a location of a folder selected by a user. As search word is inputted from the user, the cloud drive service may provide a search result corresponding to the search word to the content area 1700.

Figure 18A:
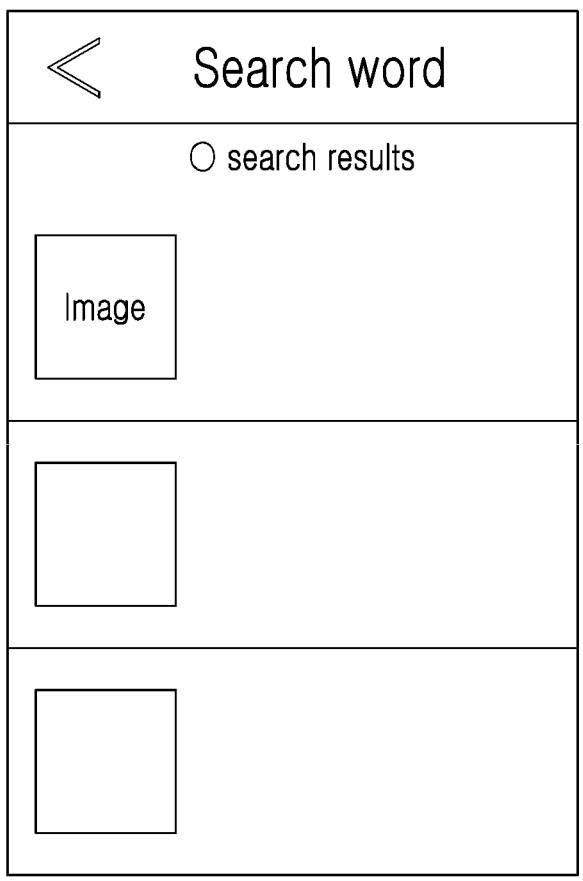
FIGS. 18A and 18B illustrate an example of forms of files provided in a cloud drive service according to an exemplary embodiment.
Figure 18B:
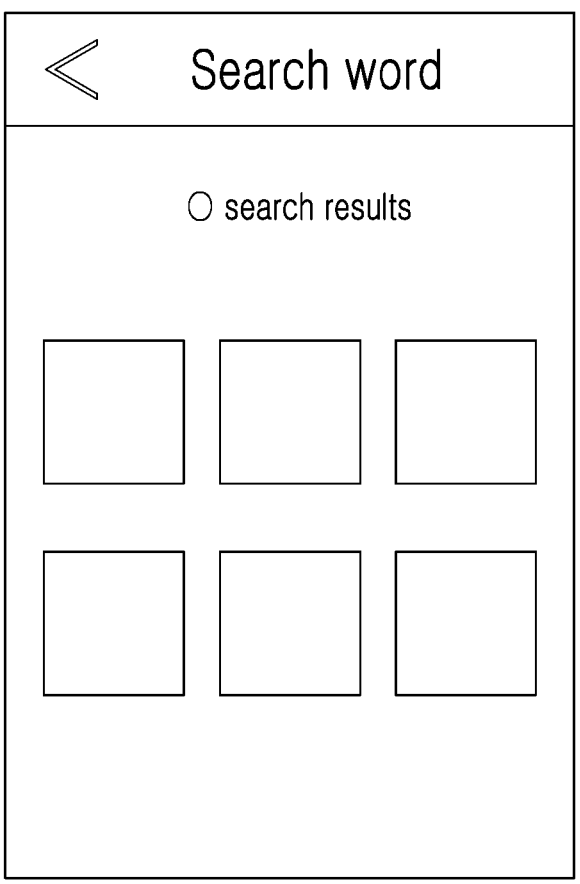

Referring to FIGS. 18A and 18B, it is an example of forms of files provided from a cloud drive service as a search result. A cloud drive service may provide a search result for search word in a list form or tile form. The cloud drive service may provide information (e.g. file name, file size, file storage location, filed stored time, and the like) of a file corresponding to the search result. Also, detailed information for a file selected by a user from the search result provided to the cloud drive service may be provided.

Referring to FIG. 18A, the cloud drive service indicates providing the search result in a list form, and referring to FIG. 18B, the cloud drive service indicates providing the search result in a tile form. The cloud drive service may basically sort and provide files in a list form, but it may be changed to tile form according to a user setting.

Figure 19:
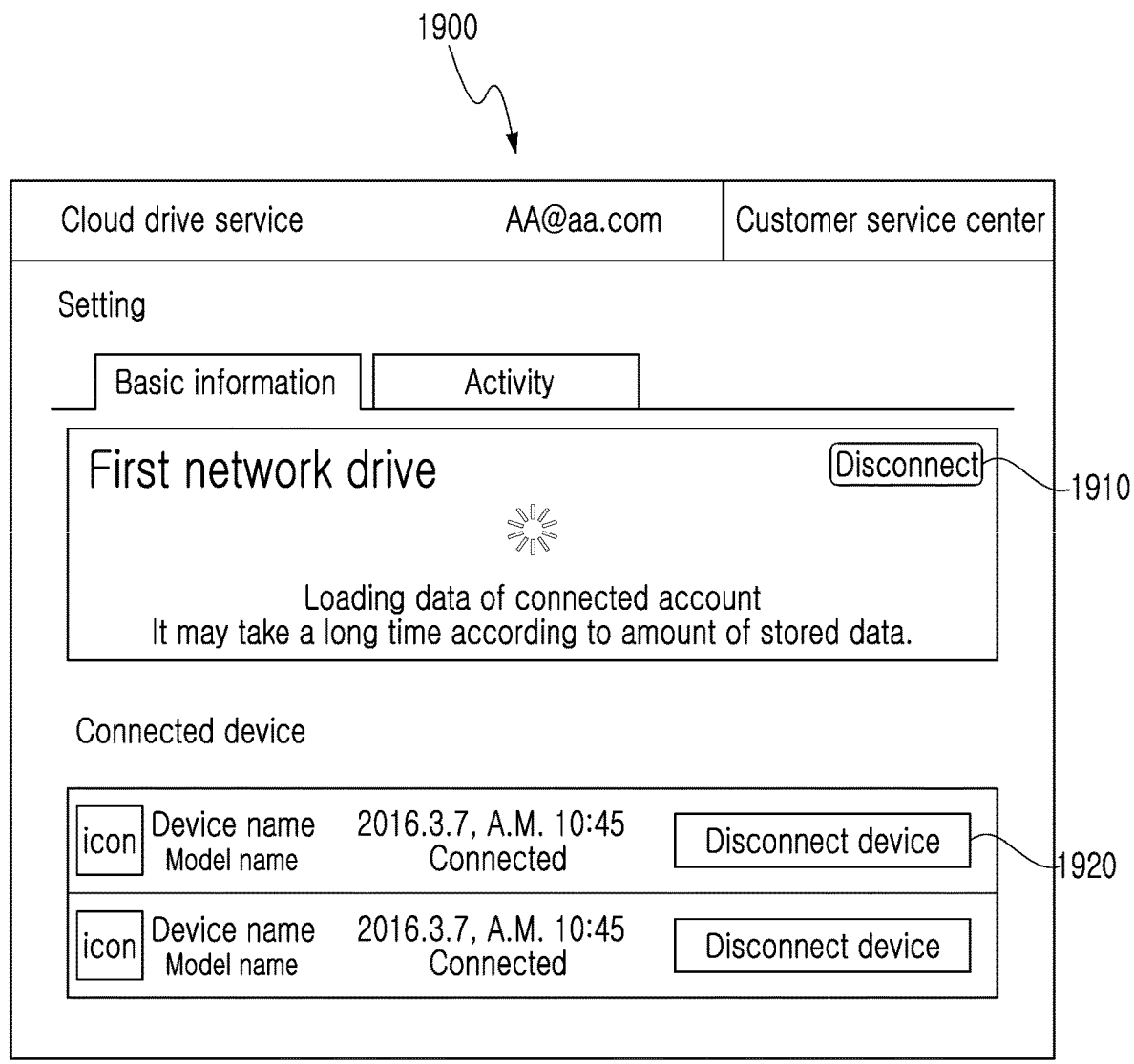
FIG. 19 illustrates an example of setting cloud storages and electronic devices capable of remote access in a cloud drive service according to an exemplary embodiment.

FIG. 19 illustrates an example of setting cloud storages and electronic devices capable of remote access in a cloud drive service according to an exemplary embodiment.

A cloud drive service 1900 may provide a function for setting a network drive and a function for setting connected devices. The cloud drive service 1900 may provide information relating to cloud storages interconnecting to the network drive, and provide progress state information for synchronizing data stored in the cloud storages. Also, the cloud drive service 1900 may provide a user interface 1910 disconnecting the cloud storages interconnecting with the network drive, and may disconnect the interconnected cloud storages through the user interface 1910.

The cloud drive service 1900 may provide information of devices connected to the cloud drive service 1900 with a user account. Here, name, model name, connection time information, and the like of the connected devices may be displayed. The cloud drive service 1900 may provide a user interface 1920 disconnecting the connected devices, and may disconnect the connected devices through the user interface 1920.

Figure 20:
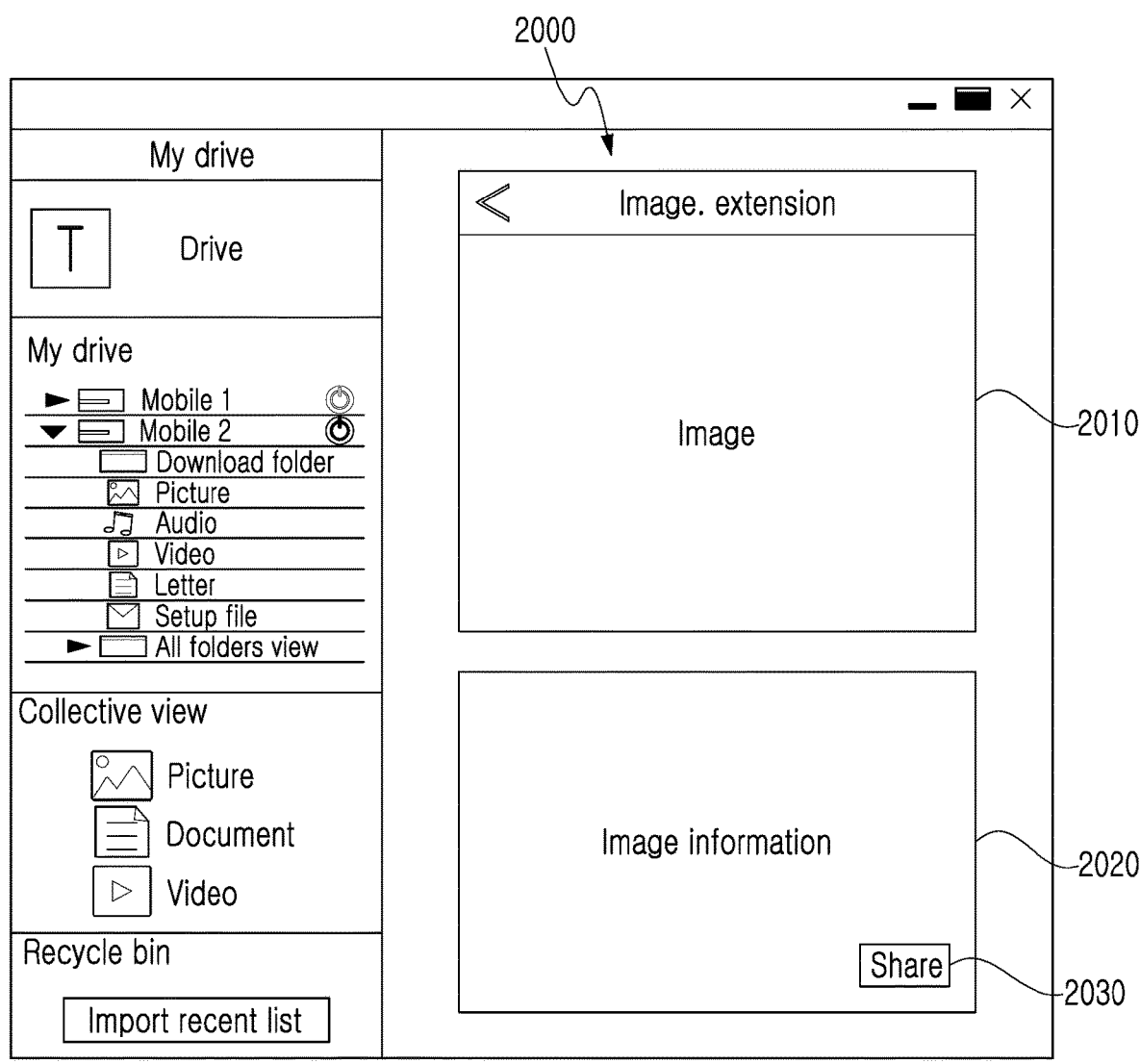
FIG. 20 illustrates an example of providing detailed information for files selected in a cloud drive service according to an exemplary embodiment.

Referring to FIG. 20, a cloud drive service may provide detailed information for selected file. Image, document, video, and the like may be provided in a list form or tile form in the cloud drive service. For example, the cloud drive service may provide an image 2010 and detailed information 2020 for an image file selected from a user to a content area 2000. The cloud drive service may provide file type, file size, location, owner, revision date, creation date, a sharing interface 2030 for sharing as the detailed information 2020 of the image file selected from the user. The cloud drive service may provide to share with other devices connected to the cloud drive service through the sharing interface 2030.

The units described herein may be implemented using hardware components, software components, and/or a combination thereof. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The exemplary embodiments may be recorded in non-transitory computer-readable media including program instructions to implement various operations embodied by a computer. The media may also include, alone or in combination with the program instructions, data files, data structures, and the like. The media and program instructions may be those specially designed and constructed for the purposes of the present disclosure, or they may be of the kind well-known and available to those having skill in the computer software arts. Examples of non-transitory computer-readable media include magnetic media such as hard disks, floppy disks, and magnetic tape; optical media such as CD ROM disks and DVD; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter.

According to exemplary embodiments, a wireless connection system may integrally manage a network drive interconnecting and managing a plurality of cloud storages and a plurality of electronic devices capable of remote access.

According to exemplary embodiments, a wireless connection system may upload/download files or folders by remotely accessing to electronic devices connected to a user account.

While certain exemplary embodiments and implementations have been described herein, other embodiments and modifications will be apparent from this description.

Accordingly, the invention is not limited to such embodiments, but rather to the broader scope of the presented claims and various obvious modifications and equivalent arrangements.

What is claimed is:

1. A method for wirelessly connecting portable devices through a cloud drive service performed in a wireless connection system implemented with a computer, the method comprising:
    providing a list of portable devices capable of remote access using a same user account of the cloud drive service of a user;
    connecting portable devices selected from the list of portable devices capable of remote access to the same user account;
    automatically updating a list of folders in the connected portable devices and a list of files included in the folders; and
    integrally managing files included in the connected portable devices,
    wherein the integrally managing of the files comprises:
    interconnecting a plurality of cloud storages provided from different cloud drive service platforms,
    integrally managing the interconnected cloud storages,
    wherein the cloud drive service is configured to provide a meta service by interconnecting the plurality of cloud storages to the same user account, and is configured to mediate between the portable devices to transmit and receive the files without a separate cable by wirelessly connecting the portable devices capable of remote access with the same user account, and
    wherein the cloud drive service is installed on each of the portable devices, and wireless connecting setting and activation state of each of the portable devices are activated,
    wherein the automatically updating comprises:
    confirming whether access authority of each of the connected portable devices is valid;
    in response that access authorities of all of the connected portable devices in a connected device list of the connected portable devices are valid, automatically updating the list of folders in the connected portable devices and the list of files included in the folders; and
    in response that access authority of at least one of the portable devices is not valid, automatically updating a state of the connected portable devices and the connected device list based on the updated state, and automatically updating a list of folders included in connected portable devices of the updated connected device list and a list of files of the folders included in connected portable devices of the updated connected device list.

2. The method of claim 1, wherein the integrally managing of the files comprises:
    providing progress state information to a specific area of the portable devices in real-time, and
    disconnecting a first portable electronic device among the connected portable devices from the cloud drive service based on the progress state information such that wireless connecting setting and activation state of the first portable electronic device are inactivated,
    providing a file directory of the connected portable devices, and
    the progress state information includes file upload, file move, file copy, file delete, file revision, and file download.

3. The method of claim 2, wherein the integrally managing of the files comprises:
    in response to a first portable electronic device attempting to access a second portable electronic device among the connected portable devices, authorizing the first portable electronic device to read file directory in the second portable electronic device.

4. The method of claim 3, wherein the integrally managing comprises providing progress state of instructions requested from the first portable electronic device or the second portable electronic device.

5. The method of claim 1, wherein the integrally managing of the files comprises:
    in response to a first portable electronic device among the connected portable devices requesting a file included in a second portable electronic device among the connected portable devices, receiving the requested file from the second portable electronic device; and
    downloading the requested file to a local drive of the first portable electronic device by transmitting the requested file received from the second portable electronic device to the first portable electronic device,
    wherein the first portable electronic device and the second portable electronic device are capable of remote access to each other using the same user account of the cloud drive service of the user.

6. The method of claim 5, wherein the integrally managing of the files comprises:
    uploading a file selected from file directories of the connected portable devices to a network drive configured with the same user account, and
    wherein the network drive configured with the same user account is configured to interconnect the plurality of cloud storages on at least one server used by the user, and integrally manage the interconnected cloud storages.

7. The method of claim 6, wherein the integrally managing of the files comprises:
    in response to the first portable electronic device requesting a file included in the second portable electronic device, receiving a file included in the second portable electronic device which is requested from the first portable electronic device from the second portable electronic device as the file included in the second portable electronic device is requested to upload to the network drive from the first portable electronic device among the connected portable devices, and uploading the file received from the second portable electronic device to the network drive.

8. The method of claim 6, wherein the integrally managing of the files comprises:
    in response to receiving a request to upload the requested file from the first portable electronic device, downloading the requested file to the network drive from the first portable electronic device among the connected portable devices,
    downloading the requested file from the first portable electronic device through the network drive, and
    transmitting the downloaded file to the local drive of the first portable electronic device.

9. The method of claim 6, wherein the integrally managing comprises:
    providing an editing function of folders or files in the connected portable devices and an editing function of folders or files stored in the cloud storages through the network drive configured on the same user account.

10. The method of claim 1, wherein the connecting of the portable devices comprises:
 connecting one portable device;
 releasing mapping with the one portable device connected to the same user account; and
 deleting the mapping on the list of portable devices capable of remote access.

11. The method of claim 1, wherein the connecting of the portable devices comprises:
 providing a file and folder list of the connected portable devices to be accessible according to connection state of the connected portable devices.

12. The method of claim 1, wherein the integrally managing comprises:
 classifying files stored in the connected portable devices into predetermined types; and
 providing a list of the classified files.

13. The method of claim 1, wherein the integrally managing comprises:
 authorizing access to a physical drive included in the connected portable devices.

14. A computer program stored in non-transitory computer-readable media provided to implement a method for wirelessly connecting portable devices through a cloud drive service, the method for wirelessly connecting, the method comprising:
 providing a list of portable devices capable of remote access using a same user account of the cloud drive service;
 connecting portable devices selected from the list of portable devices capable of remote access to the same user account;
 automatically updating a list of folders in the connected portable devices and a list of files included in the folders; and
 integrally managing files included in the connected portable devices,
 wherein the integrally managing of the files comprises:
 interconnecting a plurality of cloud storages provided from different cloud drive service platforms,
 integrally managing the interconnected cloud storages,
 wherein the cloud drive service is configured to provide a meta service by interconnecting the plurality of cloud storages to the same user account, and is configured to mediate between the portable devices to transmit and receive the files without a separate cable by wirelessly connecting the portable devices capable of remote access with the same user account,
 wherein the automatically updating comprises:
 confirming whether access authority of each of the connected portable devices is valid;
 in response that access authorities of all of the connected portable devices in a connected device list of the connected portable devices are valid, automatically updating the list of folders in the connected portable devices and the list of files included in the folders; and
 in response that access authority of at least one of the portable devices is not valid, automatically updating a state of the connected portable devices and the connected device list based on the updated state, and automatically updating a list of folders included in connected portable devices of the updated connected device list and a list of files of the folders included in connected portable devices of the updated connected device list.

15. A wireless connection system implemented with a computer, the wireless connection system comprising:
 a providing unit configured to provide a list of portable devices capable of remote access using a same user account of a user of a cloud drive service;
 a connecting unit configured to connect portable devices selected from the list of portable devices capable of remote access to the same user account;
 an updating unit configured to automatically update a list of folders in the connected portable devices and a list of files included in the folders; and
 a managing unit configured to integrally manage files included in the connected portable devices,
 wherein the managing unit is configured to:
 interconnect a plurality of cloud storages provided from different cloud drive service platforms, and integrally manage the interconnected cloud storages,
 wherein the cloud drive service is configured to provide a meta service by interconnecting the plurality of cloud storages to the same user account, and is configured to mediate between the portable devices to transmit and receive the files without a separate cable by wirelessly connecting the portable devices capable of remote access with the same user account,
 wherein the automatically updating by the updating unit comprises:
 confirming whether access authority of each of the connected portable devices is valid;
 in response that access authorities of all of the connected portable devices in a connected device list of the connected portable devices are valid, automatically updating the list of folders in the connected portable devices and the list of files included in the folders; and
 in response that access authority of at least one of the portable devices is not valid, automatically updating a state of the connected portable devices and the connected device list based on the updated state, and automatically updating a list of folders included in connected portable devices of the updated connected device list and a list of files of the folders included in connected portable devices of the updated connected device list.

16. The system of claim 15, wherein the managing unit is configured to:
 provide progress state information to a specific area of the portable devices in real-time, and
 disconnect a first portable electronic device among the connected portable devices from the cloud drive service based on the progress state information such that wireless connecting setting and activation state of the first portable electronic device are inactivated,
 provide file directory of the connected portable devices; and
 in response to a first portable electronic device attempting to access a second portable electronic device among the connected portable devices, authorize the first portable electronic device to read file directory in the second portable electronic device.

17. The system of claim 16, wherein the managing unit is configured to upload a file selected from file directories of the connected portable devices to a network drive configured with the same user account, and
 the network drive configured with the same user account is configured to:
 interconnect cloud storages on at least one server used by the user; and
 integrally manage the interconnected cloud storages.

18. The system of claim 17, wherein the managing unit is configured to:

in response to the first portable electronic device requesting a file included in the second portable electronic device, receive the requested file from the second portable electronic device; and upload the requested file received from the second portable electronic device to the network drive.

19. The system of claim 17, wherein the managing unit, in response to receiving a request to upload a file from the first portable electronic device to the network drive, is configured to download the requested file requested from the first portable electronic device through the network drive; and transmit the downloaded file to a local drive of the first portable electronic device.

20. The system of claim 15, wherein the managing unit is configured to:

in response to a first portable electronic device among the connected portable devices requesting a file included in a second portable electronic device among the connected portable devices, receive the requested file from the second portable electronic device; and download the requested file to a local drive of the first portable electronic device by transmitting the requested file received from the second portable electronic device to the first portable electronic device, wherein the first portable electronic device and the second portable electronic device are capable of remote access to each other using the same user account of the cloud drive service of the user.

\* \* \* \* \*